(12) United States Patent
Yang

(10) Patent No.: US 11,403,708 B2
(45) Date of Patent: Aug. 2, 2022

(54) INVESTOR RISK MANAGEMENT SYSTEM

(71) Applicant: Jian Helen Yang, Lexington, MA (US)

(72) Inventor: Jian Helen Yang, Lexington, MA (US)

(73) Assignee: ANDES WEALTH TECHNOLOGIES, INC, Lexington, MA (US)

( * ) Notice: Subject to any disclaimer, the term of this patent is extended or adjusted under 35 U.S.C. 154(b) by 660 days.

(21) Appl. No.: 16/418,627

(22) Filed: May 21, 2019

(65) Prior Publication Data

US 2020/0372580 A1   Nov. 26, 2020

(51) Int. Cl.
   *G06Q 40/06* (2012.01)
   *G06Q 40/04* (2012.01)
   *G06Q 30/02* (2012.01)

(52) U.S. Cl.
   CPC ......... *G06Q 40/06* (2013.01); *G06Q 30/0206* (2013.01); *G06Q 40/04* (2013.01)

(58) Field of Classification Search
   CPC ................................. G06Q 40/06; G06Q 4/04
   USPC ........................................ 705/35–45
   See application file for complete search history.

(56) References Cited

U.S. PATENT DOCUMENTS

| | | | |
|---|---|---|---|
| 2002/0198821 A1* | 12/2002 | Munoz | G06Q 40/025 705/38 |
| 2011/0153523 A1* | 6/2011 | DuBois | G06Q 40/06 705/36 R |
| 2018/0225765 A1* | 8/2018 | Wakeman | G06Q 40/06 |
| 2020/0372580 A1* | 11/2020 | Yang | G06Q 40/06 |

* cited by examiner

*Primary Examiner* — Robert R Niquette
(74) *Attorney, Agent, or Firm* — Jie Tan; JT Law Services, PC

(57) ABSTRACT

A computerized financial risk management system is disclosed that includes risk tolerance test, expectation reality check and real-time risk monitor using graphs of returns and risks. Real-time risks are calculated daily based on a set of rolling short-term, medium-term and long-term time windows and graphs of annualized returns and risks for said set of time windows are provided for analysis.

16 Claims, 14 Drawing Sheets

FIG. 12

INVESTOR RISK MANAGEMENT SYSTEM

CROSS-REFERENCE

This Application claims the priority of the U.S. Provisional Patent Application No. 62/739,448, filed on Oct. 1, 2018, and entirety of which is hereby incorporated by reference.

DESCRIPTION OF RELATED ART

The present application relates to a computerized system for managing risks in financial investment, in particular, relates to a computerized system that determines the risk tolerance levels of individual investors, manages investors' expectations and monitors real-time risks of model portfolios and investment portfolios for individual investors, with or without the assistance of a financial advisor. Throughout this application, time horizons, time frames and time windows are synonym terms referring to a time period with a start date and an end date. Real-time risk refers to a risk analytics calculated by the analytics engine of the invention daily on rolling basis. This is in contrast to the static risk analytics calculated over a static long-term horizon. In other types of financial systems, such as trading systems, real-time data may refer to intraday minute-by-minute pricing and other financial data.

Note that the points discussed below may reflect the hindsight gained from the disclosed inventions, and are not necessarily admitted to be prior art.

The difficulty is well known for individual investors to understand and manage and mitigate risks in investments, particularly when the markets are dynamic. The standard practice in the financial industry is to categorize individual investors into several risk buckets based on risk tolerance tests and/or questionnaires, then assign a static or semi-static model investment portfolio of the risk level to the investor. However, the calculated risk of the model portfolio is based on its long-term historical average risk calculated over a static period of time. For example, an investor with medium risk tolerance level can be assigned a balanced portfolio of 50% stocks and 50% bonds, which is adequate as a baseline but may no longer be adequate when market condition deviates from long term averages.

Being able to accurately assess the risk tolerance of an investor is a first crucial step in financial planning and wealth management. The common assessment practice uses a questionnaire to obtain the information of the investor's age, expected retirement age, life expectancy, income and assets, and supplemented by a risk tolerance question that typically presents a variety of theoretical investment scenarios with possible gain and loss trade-offs for investors to choose from. Throughout this application, the terms gain or loss and upside or downside are used interchangeably, refer to possible financial gain or loss after an initial amount of an investment. For the currently available risk tolerance testing methods in the industry, the relationships between the theoretical gains and losses presented in these scenarios are not based on real market data, therefore the investor tolerance test results through these theoretical gain or loss scenarios are not accurate readings of the investor's risk tolerance. Furthermore, the risk tolerance score obtained these methods may not be correctly mapped to a model portfolio in order to form an investment recommendation.

Therefore, there is a long felt need in the financial investment field to be able to set up the gain/loss scenario as close as possible to the actual trade-offs investors face when making investment decisions. Furthermore, there is significant ambiguity in current methods in presenting gains and losses. The terms could be interpreted as the expected gains and losses of statistical means, or the upper and lower bounds of a certain confidence interval of a statistical analysis, or something else. Depending on how investors intuitively interpret the gains and losses in the presentation, often without realizing the assumption they are making, the assessment test may give different results, making the results unreliable. There is a need to provide a presentation method that makes the meaning of the gain and loss in risk tolerance test explicit to the investors.

The need also exists in the field to be able to manage investments with portfolio model adjusted with real financial data in dynamic markets. When real market data deviate from the long-term averages, the current practice advises investors to stick with the initially chosen model portfolio, a practice called "buy and hold". But this may be a bad investment advice in certain time. For example, an initial balanced portfolio of 50% stocks and 50% bonds may be a good choice for an investor with medium risk tolerance level, but during the 2008 financial crisis, the risk of the same balanced portfolio would have gone well above the investor's risk tolerance level. Telling an investor to hold the investment position is like advising a person to wait in the blizzard rather than seeking shelter—"if you wait long enough, the sun will eventually come out". Another example, during the bull market from 2010 to 2017 when the volatility of U.S. stock market was much lower than historical averages, the investor could have adopted a more aggressive portfolio model to invest which would still have been below his or her risk tolerance level. As a result, the current practice lead to failed promises of protection in the down market and missed opportunities in the up market.

It is particularly useful for individual investors to be able to automatically monitor investment risk in real-time with easy to use computerized tools. Institutional investment managers and hedge funds utilize advanced analytical tools such as stress tests and Monte Carlo simulations to calculate advanced analytics such as value at risk and tail risk that are difficult to use, difficult to understand and not suitable for financial advisors and individual investors. In order to develop such a cost effective yet efficient financial technology system, finding a simple, sensible and reliable framework to represent investment risk remains a key. There are risk management systems and methods by pre-calculating and comparing performance metrics under various combinations of financial assets. For example, US 2015/0154706 provides a computerized system that calculates performance metrics for a portfolio including a subset of the assets under various scenarios to help users compare different investment options. But such calculation is also based on historical performance and may not reflect the risks for different time frames.

Modern portfolio theory uses the mean-variance optimization to help investors identify the relationship between risk and reward. The mean, denoted as $\mu$, is the mathematical term for average value. For financial modeling, the annualized average return becomes the expected return in forward looking. Volatility, denoted as $a$, defined as the standard deviation of the daily return over a given period of time. By definition, variance is the squared of the standard deviation, i.e. volatility, which represents how varied, or spread out, the numbers in a given set are. In the context of finance, volatility is the most commonly used measure of risk and a cornerstone of the modern portfolio theory. The mean-variance analysis allows investors to find the biggest reward for a given level of risk or the least risk for a given level of return. If two different securities have the same expected return, but one has lower risk, the one with lower risk is the better pick. The risk and return chart is a standard tool in finance to analyze investment performance, which can be applied to an individual security, an investment portfolio or a model portfolio. An individual security can be a stock, a bond or a fund such as a mutual fund or an Exchanged Traded Fund (ETF). Modern Portfolio Theory shows that an investor can construct a portfolio of multiple assets to maximize returns for a given level of risk. Likewise, given a desired level of expected return, an investor can construct a portfolio with the lowest possible risk. The process of constructing a portfolio of multiple assets is called asset allocation.

Traditional tools use long-term average returns and risks to determine which asset allocation of a model portfolio suits an investor's risk tolerance level. These tools do not satisfy the need to adapt investment strategy to dynamic market conditions due to the lack of real-time risk monitoring. A computer system to visualize risks in real-time in various time frame and format that is easy to understand, such as based on the well-accepted modern portfolio theory, is needed to provide proactive risk management for financial advisors and individual investors.

SUMMARY

The present application discloses a novel visual financial risk management software platform. Having a unique set of methodologies, analytics and user interface designs, this analytic tool set helps financial advisors and individual investors to assess their risk tolerance level, manage investment expectations and monitor risk exposure of their investment portfolios in real-time. The software platform further provides risk analysis in a complete time spectrum: short-term, medium-term and long-term time horizons in order to provide a complete risk understanding for investors.

In one aspect of an embodiment, an analytics engine for user risk tolerance test is provided to calculate the upsides and downsides of a set of model portfolios based on long-term average returns and volatility numbers for a user-specified time horizon (for example, six-month or one-year) and a given confidence interval to provide a realistic scenario for the risk tolerance test. In one aspect of an embodiment, financial advisory firms have the option to set up a customary set of model portfolios with long-term average return and volatility numbers for a user-specified time horizon.

In one aspect of an embodiment, a visual graphics engine is provided to graphically display an investor's risk tolerance test on a screen or on paper. The graphics engine displays the calculated upsides and downsides of a set of model portfolios side by side so an investor can choose a model portfolio with a visualized upside and downside, such chosen model portfolio thus embodies the risk tolerance level of the investor, with or without the guidance of a financial advisor. This user interface also allows the user to adjust its investment amount, specified time horizon and confidence interval for calculation and adjustment.

In one aspect of an embodiment, an analytics engine is provided that will retrieve on rolling basis historical and daily market close prices and corporate actions such as dividends and stock splits for securities, including individual stocks, bonds, mutual funds and Exchange Traded Funds (ETFs), and from which the daily returns are calculated. Daily close prices are adjusted for dividends and stock splits using standard methodologies. The analytics engine further calculates the daily returns of model portfolios and investors' investment portfolios using weighted average of daily returns of the constituents that make up the models and portfolios.

In one aspect of an embodiment, the analytics engine further calculates, for each security, model and portfolio, annualized returns and volatilities for an entire set of sliding windows ranging from 1-month to 30-year on a rolling basis, for each day in the past and going forward, based on the daily returns of a sliding window. The analytics engine further calculates a set of investment health indicators for model portfolios including return health, risk health and efficiency health.

In one aspect of an embodiment, a visual graphic engine is provided to display in a scatterplot of the calculated rolling annualized return versus risk (as indicated by volatility) to monitor in real-time the performance and risk exposure of securities, models and portfolios. Using the longest-term average risk and return of model portfolios sitting on an investment efficient frontier as the reference point, visual graphs are made to show the risk movement over time, and its association with investment returns in various time frames including short-term, medium-term and long-term. When the graphs demonstrate the relationship of "high risk, high return" no longer present, the investor can decide to adjust his/her investment portfolio in order to reduce unnecessary risk exposure.

In one aspect of an embodiment, a visual graphic engine produces a risk and return chart to help investors visualize whether their investment return expectations are realistic in the context of their risk tolerance level and market reality. The risk and return for particular time horizons of particular market segments represented by representative ETFs and/or models are graphed and displayed on a screen or printed on paper, and the expected return of an investor and his/her risk tolerance is marked out in the same graph to provide the user a visual indication whether his/her return expectations in the context of their risk tolerance levels are realistic. This user interface further allows a user to play with various theoretic criteria in which the user can choose a different risk tolerance level, enter another expected return and select various market segments/models and time horizons as reference points.

In one aspect of an embodiment, a user account management engine is provided to allow users to enter investment portfolios for the analytics engine.

In one aspect of an embodiment, backend batch interfaces are provided to import investment portfolios from third party systems, for example, investment proprietary systems and portfolio accounting systems.

BRIEF DESCRIPTION OF THE DRAWINGS

The disclosed application will be described with reference to the accompanying drawings, which show important sample embodiments of the invention and which are incorporated in the specification hereof by reference, wherein:

FIG. 12 shows an example user interface for receiving user input for financial planning and risk management in accordance with this application.

DETAILED DESCRIPTION OF SAMPLE EMBODIMENTS

Figure 1:
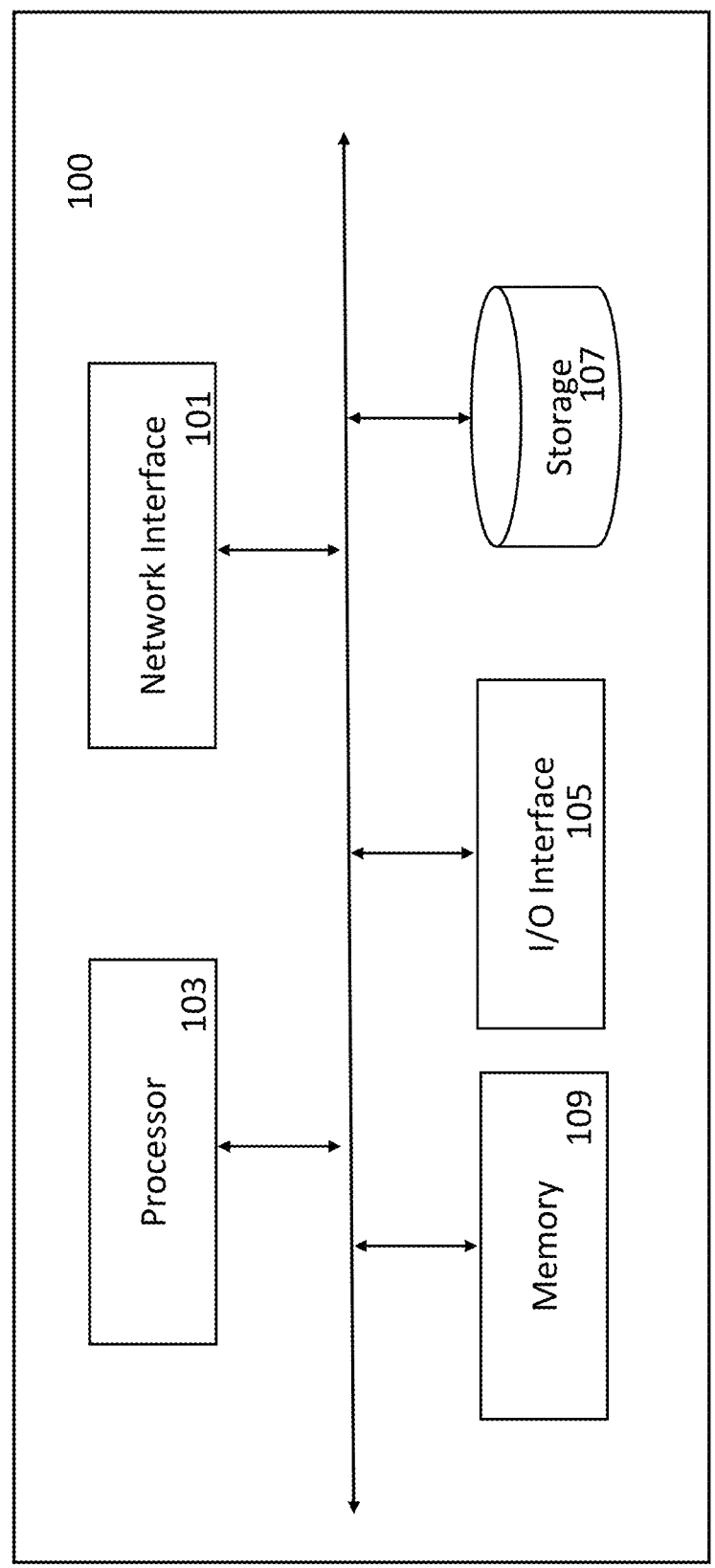
FIG. 1 schematically shows an example required computer structures in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

All terms and terminologies in this application should be understood in the same meaning as normally used in the field of finance. In finance, the term "security" refers to an instrument that can be invested in, such as a stock, a bond, a mutual fund or an Exchanged Traded Fund (ETF).

A "portfolio" is a group of financial securities being held by an investor with power to trade, including a combination of individual stocks, bonds, mutual funds, ETFs and alternative investments to achieve an investment objective. Investment objectives usually mean two things: managing risk exposure and achieving financial return goals.

A "model" is a set of financial securities selected and combined in order to deliver targeted investment objectives including risks and returns that can be used as a template for investment portfolios to follow.

The term "asset allocation" refers to allocating investments among different market segments such as stocks and bonds. Asset allocation is one of the primary considerations in model and portfolio construction. According to financial research, asset allocation is the main driver of investment return as opposed to stock picking or market timing.

The term "time horizons", "time frames" and "time windows" are synonym terms referring to a time period with a start date and an end date. The term "real-time risk" refers to a risk analytics calculated by the analytics engine of the invention on a daily rolling basis.

The term "return" in this application generally refers to the end value minus an initial value over a specified time window, i.e. the increase in value, divided by the initial value. There are two types of returns: price return and total return. Price return is the return of an investment over a period of time when only price appreciation is used for calculation, while the income generated from the investment, such as interests and dividends, are not used for calculation. Total return is the actual increase of investment value of the investment over a period of time including not only capital price appreciation but also interests and dividends. Total return is an accurate measure of investment performance and is preferably used for calculation of returns in this application.

The term "volatility" refers to a statistical measure of the dispersion of returns of an investment such as a security, market index or a portfolio. In the security markets, high volatility is often associated with big swings in trading price in either direction, therefore the higher the volatility, the riskier the investment. Volatility can be measured by using the standard deviation of returns (typically daily returns) of certain intervals over a period time (such as over one-year) from that same security or market index. In Excel, the formula for standard deviation is STDEV.P( ). The volatility of a stock market index, such as the Standard & Poor 500 Index, is often used to represent the volatility of the U.S. stock market.

The term "risk" in this application is defined by volatility, i.e. the standard deviation of the daily returns over a specified time window, in similar way as it is used in the Modern Portfolio Theory, introduced by Harry M. Markowitz in 1952, for which he was later rewarded a Nobel Prize in Economics.

The term "long-term average" refers to calculated average financial results for a period of 10 or more years, preferably 30 years in this application.

The terms "upside" and "downside" refer to a statistical possible financial gain and loss around the mean value $\mu$ with a particular confidence level for a theoretical initial amount of an investment. The mean, denoted as $\mu$, is the mathematical term for average value after the market fluctuation. Volatility, denoted as $\sigma$, defined as the standard deviation of the daily return over a given period of time. If confidence level is set to be 80%, the downside is $\mu - 1.28\sigma$, the upside is $\mu + 1.28\sigma$. If confidence level is set to be 95%, the downside is μ−2σ, and the upside is μ+2σ. The statistical calculation uses the normal distribution model.

The term "process" in this application means coming up with a financial solution executed by a computer for the solution.

The term "method(s)" term means a method for object-oriented programming code whereas it performs a subroutine and is exclusively associated with a class or an object. Normally, it consists of a sequence of programming statements to perform an action, a set of parameters to customize those actions, and possibly an output value.

The term "subsystem", "engine" or "module" are used interchangeably, it represents a combination of packages and a set of executable computer codes and classes for performing a particular function on a computer processor. The packages contain all the elements, including unique id elements, models, source files, html files, etc. that have executable codes.

In this application, a "data module" means a set of multiple but unique methods (methodologies) for the automation of remote data network services, data communications, data analysis, data storage, data storage retrieval, data display or interactive user interfaces for data input.

An "analytics engine" means a set of multiple but unique methods (methodologies) for analyzing a particular set of financial data for risks and returns.

A "graphics engine" means a set of multiple but unique methods (methodologies) for the automation of receiving analytics results and display the results on a screen or a monitor or an I/O interface according to a user's criteria.

A "server" is a functional entity that receives requests from a user or client computer, and processes the requests and responds to the user or client computer in accordance with the particular requests.

A "rolling basis" time frame refers to a sliding time window counted from a given day, i.e. the last date of the time window, back for the number of days of the time window, and the end date of the time window will slides or rolls along the time line forward.

The term "annualized return" is calculated in accordance with the standard method in finance.

It is contemplated and intended that the computer architecture not only functions in client serving computing, but also encapsulates application services through a service-oriented architecture layer consisting of an application layer, a business service layer, and the orchestration layer.

Modern Portfolio Theory indicates that a diversified portfolio reduces the risk through diversification. Asset allocation is used for allocating investments among different market segments to reduce risks. When comparing long-term performances of different market segments, such as the performances of stocks and bonds over 30 years or more, the notion of "high risk, high return" generally holds true. But this general observation may not always be correct for guiding investment in present market where most of the investors do not or cannot stay in the same position for 30 years. Furthermore, in a given market segment, a period of high volatility often accompanies price decline. In this application, a set of analytic computer processes and methods are based on short-term, medium-term and long-term risks and returns in order to monitor risk and return relationship in real-time, thus to more accurately guide investment decisions.

In reference to FIG. 1, a risk management system 100 includes various hardware to transform the received and retrieved digital financial market data into tangible analytics graphics on a monitor screen or to be printed on paper. The computing hardware include processors 103 for loading and executing the computer instructions for risk analysis, network interface 101 for connecting to remote databases, users, and storage computer chips, database systems 107 for storing data and analytics results, memory 109 for storing live parameters at the computation time in order to execute the risk analysis software instructions, and I/O interface 105 for displaying and outputting the results from executing the computer instructions for financial risk analysis.

Figure 2:
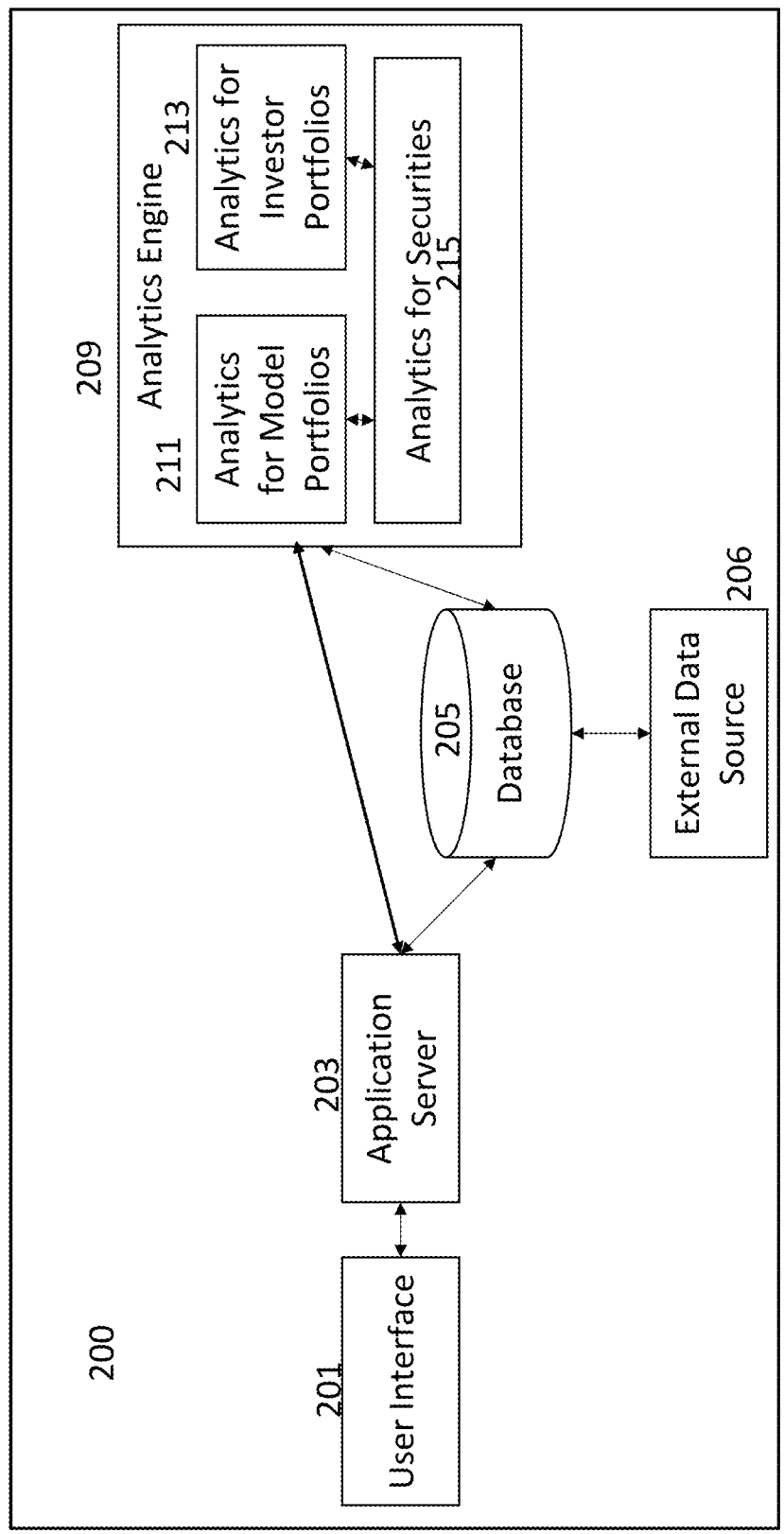
FIG. 2 schematically shows example interactions between the functional components of an example financial risk managing system in accordance with this application.

In reference to FIG. 2, the function components of executable instructions for risk management system 200 are shown. Risk management system 200 includes a user interface module 201 that receives input criteria from a user and sends the requests about a particular investor to application server 203 for processing. Application server 203 processes the requests received and retrieves the particular financial data and user data from database 205 to perform the user requests. Market financial data and analytics are also populated in database 205 by using nightly batch processes to import data from external data sources 206 and to store in database 205. Then analytics engine 209 calculates the analytics routines and results are stored in database 205 as well.

When new users, new portfolios or new securities are added during the day, database 205 may not have the data from the previous nightly batch process to serve the user requests, application server 203 also sends instructions to analytics engine 209 for particular risk analyses according to the requests it received and the database may retrieve data from external data source 206 as needed. Analytics engine 209 conducts data processing with three analytics modules upon retrieving data from database 205 through a database module: analytics module 211 for processing analytics data of model portfolios, analytics module 213 for processing analytics data of investor's real investment portfolios, both of which are built on top of analytics module 215 that processes analytics data for securities including individual securities, mutual funds and Exchanged Traded Funds (ETFs) because models and portfolios are consisted of individual securities.

Figure 3:
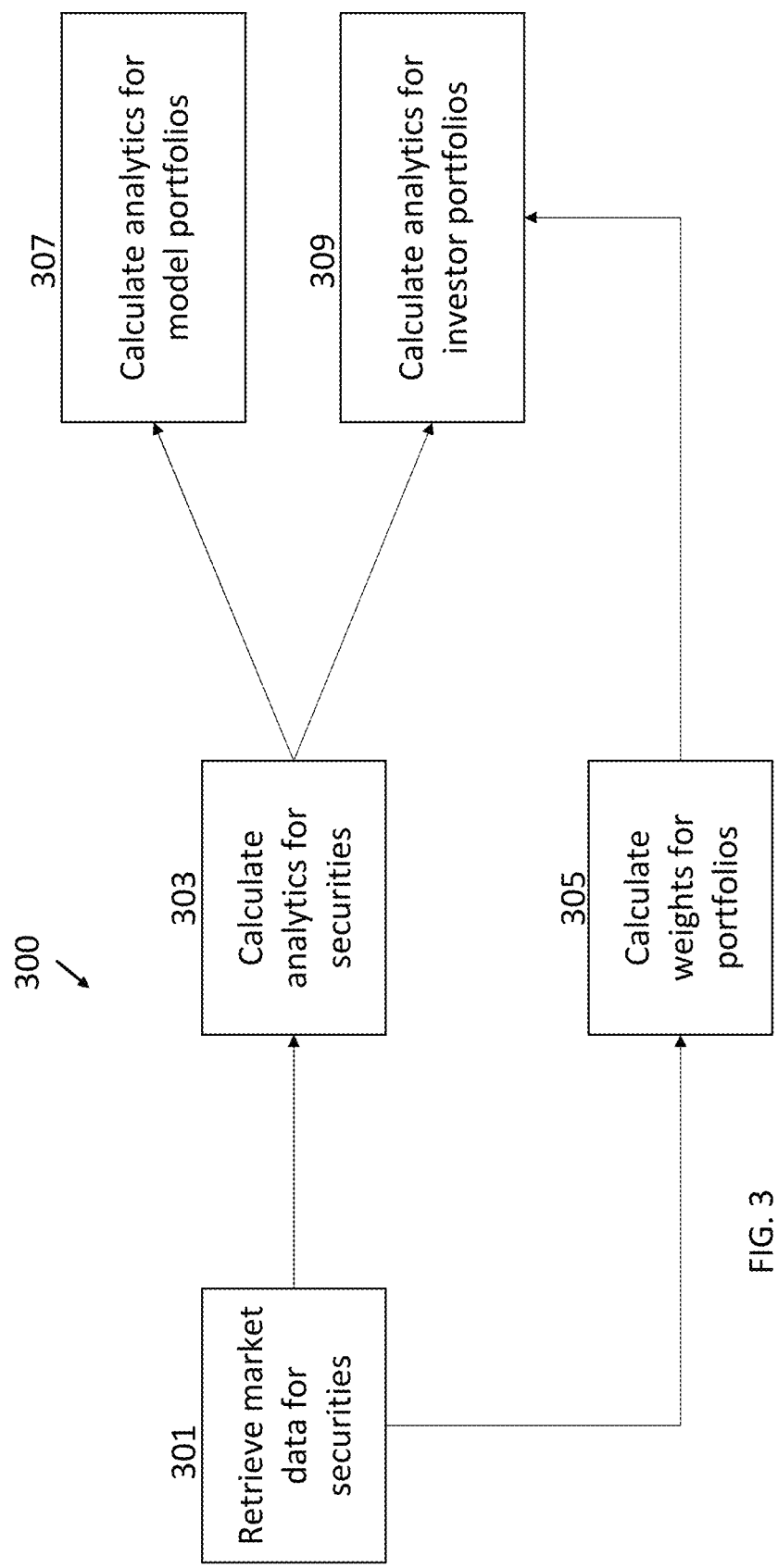
FIG. 3 is a flow chart for providing a financial risk analysis in an example financial risk managing system in accordance with this application.

In reference to FIG. 3, flow chart 300 shows the logic process of analytics engine 209. Upon receiving instructions from application server 203 or being invoked as part of the nightly batch processes, analytics engine 209 will start with step 301 to retrieve market data for the specified securities. After receiving the market data, step 303, performed by analytics module 215 of FIG. 2, will calculate risks and returns for each security, followed by step 307 which will calculate risks and returns of model portfolios (performed by analytics module 211 in FIG. 2). Calculating analytics for investor portfolio comprises an extra step, which is step 305 that calculates the weight of each security in the portfolio. Step 309 combines the results from step 303 and 305 and calculates analytics for investor portfolios. Both step 305 and step 309 are performed by analytics module 213 in FIG. 2.

Figure 4:
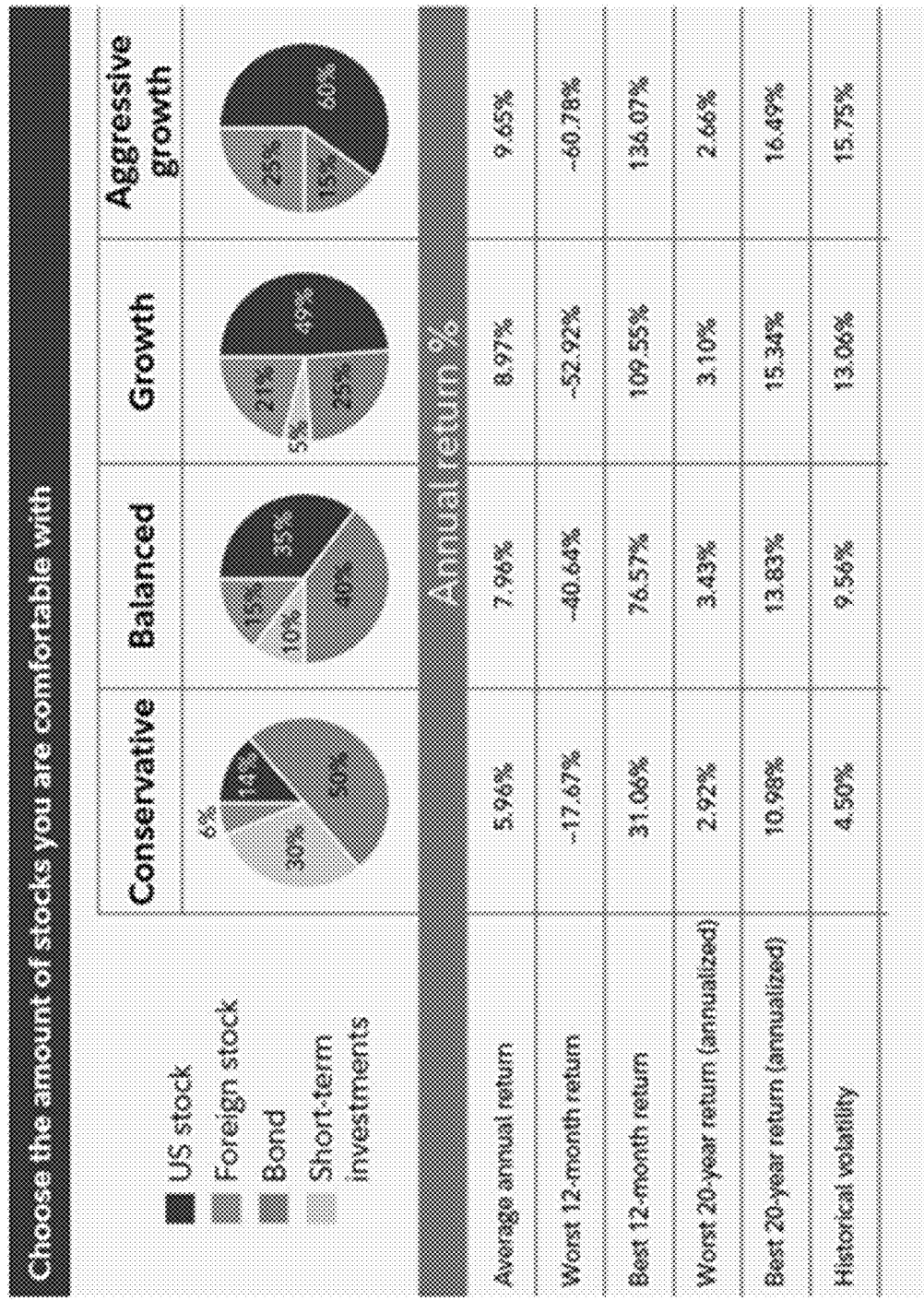
FIG. 4 shows an example prior art of a set of asset allocation models commonly used in investment management.

FIG. 4 shows a set of commonly used model portfolios consisting of stocks including U.S. stocks and foreign stocks, and fixed income instruments, commonly referred to as "bonds", including bonds and short-term instruments such as money market funds. A conservative model portfolio may consist of 20% stocks and 80% of bonds, a balanced model portfolio may consist of 60% stocks and 40% bonds, alternatively, 50% stocks and 50% bonds, growth model portfolio may consist of 70% of stocks and 30% of bonds, and an aggressive growth model portfolio may consist of 85% stocks and 15% bond. Based on security pricing data from year 1926 to 2017, the corresponding average annual return respectively is 5.96%, 7.96%, 8.76% and 9.65% while the corresponding historical volatility is 4.50%, 9.56%, 13.06% and 15.75%. Over this 91-year long period of time, there is a positive correlation between the average annual return and the historical volatility where the higher risk brings higher return. This correlation thus offers the basis for financial advisors and other financial service providers to categorize investors into several groups, and to suggest a similar set of asset allocation models to guide investment for investors of different group of risk tolerance levels.

However, the markets can deviate from the long-term averages, for example, in year 2008, the market risk for even a balanced portfolio went through the roof, and the average returns were in the negative, a balanced investment model might have been well above an investor's target risk tolerance level. In contrast, from 2009 to 2017, the average returns were robust and the market also had low volatility, a reasonable investor could have chosen the more aggressive model as guidance and invested more in equity that may still have been within his/her risk tolerance level. A real-time risk monitoring tool that continuously monitors the short-term and medium-term relationships between risks and returns will be very useful for individual investors and financial advisors. Investors can adapt their investment portfolios to market reality according to their investment objectives.

Figure 5:
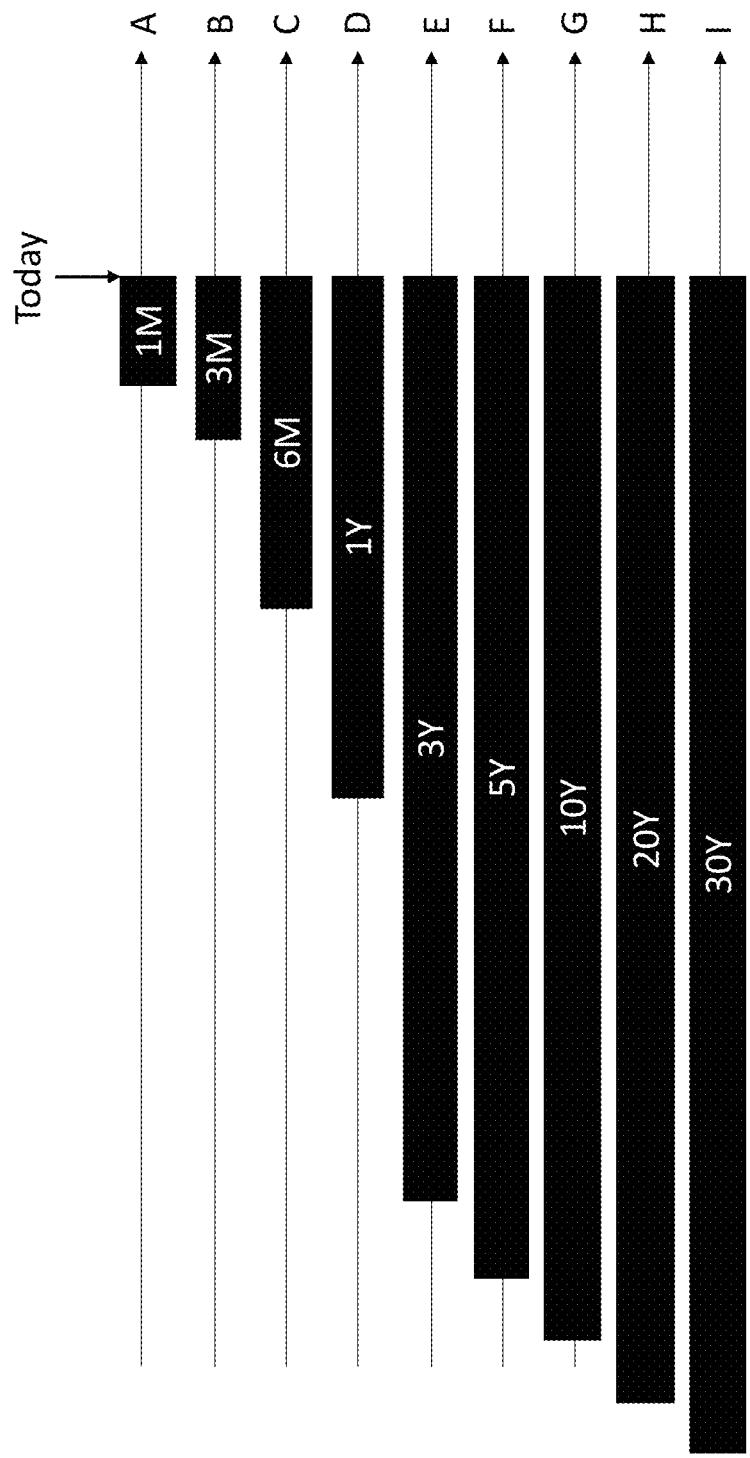
FIG. 5 schematically shows the concept of rolling time frames in accordance with this application (not drawn to scale).

The present application provides an improved financial analytics engine in order to give users a full risk analysis spectrum, by which market data of short-term, medium-term and long-term time horizons are analyzed on a rolling basis rather than on static basis. Rolling risks and average returns in real time for each time horizon will be calculated daily. The calculations conducted by analytics engine 209 are based on a set of time frames on a rolling basis as shown in FIG. 5. For example, the set of rolling time frames can include rolling time frame A that is 1-month time frame ending today (or any given day); B is for 3-month frame ending today. Likewise, C for 6-month; D for 1-year; E for 3-year; F for 5-year; G for 10-year; H for 20-year; I for 30-year, and so forth. The ending day (marked as Today) of each time window rolls forward as time progresses. By calculating the risks and returns of a full spectrum of short-term, medium-term and long-term time horizons on a daily basis, the system provides a real-time risk monitor with meaningful market context that can help financial advisors and investors to make well-informed investment decisions.

The financial analytics calculations for individual time frames will be provided in the examples, for which the analytics engine 209 runs the following execution steps:

Step 0: Retrieve historical market prices for all relevant securities for a historical time period, such as 30 years or longer if data is available.

Step 1: Calculate historical rolling risks and returns for a single security.

Step 1.1. Calculate daily return.

Step 1.2. Calculate rolling 1-month average return for each day within the historical time period.

Step 1.3. Calculate rolling 1-month volatility for each day within the historical time period.

Step 1.4. Repeat 1.2 and 1.3 for other time horizons (for example, 3-months to 30-years).

Step 2: Repeat step 1 for all relevant securities.

Step 3: Calculate historical rolling risks and returns for models as well as the set of health indicators including return health, risk health and efficiency health, for each day within the historical time period.

Step 4: Calculate historical rolling risks and returns for portfolios, for each day within the historical time period.

Step 5: As time goes forward, retrieve daily prices for all relevant securities and calculate real-time risks and returns on a daily basis for all securities, models and portfolios.

It is notable that in finance, there are two types of returns: the price return and the total return. Price return is the return of an investment over a period of time when only price appreciation is used for calculation, while the income generated from the investment, such as interests and dividends, are not used for calculation. Total return is the actual increase of investment value of the investment over a period of time including interests and dividends. Being more accurate measure of investment performance, total return is preferably used for calculation of returns in subsequent calculations. Alternatively, an investor is provided an option to choose whether to use total return or price return for analytics analysis.

The closing price of a stock, bond or ETFs is the last transaction price before the exchange or market closes for the day. In order to calculate the total return, the closing price is adjusted to consider the effects of corporate actions such as dividends and stock splits. Adjusted Closing Price (ACP) is a security's closing price on any given day of trading that has been amended to include any distributions and corporate actions that occurred at any time before the next day's market open.

The Adjusted Closing Price is calculated using the formula (1):

$$ACP = (CP)/F_{adj} \tag{1}$$

where CP is the Unadjusted Closing Price, and $F_{adj}$ is the adjustment factor calculated according to different corporate actions that include cash dividend, stock dividend, stock splits, consolidation or reverse splits, bonus issue, right offerings, share repurchase/buy-backs, spin-offs, mergers and acquisitions, bankruptcy, suspensions and halts, delistings, odd lot offer, no par value, capital reduction, write-off, write-up or write-down of capital, events involving other share types, exchange offer, and capital repayments.

Calculation of Adjustment Factor $F_{adj}$ can be found in many finance literatures, for example, Thomson Reuters Indices Corporate Actions Methodology published online. For example, for cash dividend:

$$\text{Adjustment Factor} = \frac{\text{Close Price on Dividend Date} + \text{Dividend per Share}}{\text{Close Price on Dividend Date}} \tag{2}$$

For stock dividend:

$$\text{Adjustment Factor} = \frac{\text{New Float}}{\text{Old Float}} \tag{3}$$

$$= \frac{\text{Shares Previous} + \text{Shares Issued}}{\text{Shares Previous}}$$

For stock splits:

$$\text{Adjustment Factor} = \frac{\text{New Float}}{\text{Old Float}} \tag{4}$$

For reverse stock splits:

$$\text{Adjustment Factor} = \frac{\text{New Float}}{\text{Old Float}} \tag{5}$$

For spinoffs:

$$\text{Adjustment Factor} = 1 + \frac{\text{Child Price} \times \text{Child Shares}}{\text{Parent Price} \times \text{Parent Shares}} \tag{6}$$

Having stated above, other adjustment formulas, proprietary or common, may also be used by analytics engine 209 in order to calculate adjusted daily close price for corresponding security.

The main analytics steps of engine 209 proceed as follows. At Step 0, historical close prices and adjusted close prices of preferably 30 years or more are retrieved from relevant data merchants for all relevant securities. For example, if today is Jan. 1, 2019, price data for 30 years from Jan. 1, 1989 through Dec. 31, 2018 are retrieved. Relevant securities are securities need to be analyzed including those being currently held by the investor portfolios, securities being used to represent market segments in models, or any securities of interest.

At Step 1.1, daily total return for one security or market average is calculated. The formula for daily total return for day i:

$$DTR_i = (ACP_i/ACP_{i-1}) - 1 \qquad (7)$$

where $DTR_i$ is the daily total return for day i, $ACP_i$ is the adjusted closing price for day i, $ACP_{i-1}$ is the adjusted closing price for the previous trading day.

Daily Price Return (DPR) is calculated using the formula below:

$$DPR_i = (CP_i/CP_{i-1}) - 1 \qquad (8)$$

where $DPR_i$ is the daily price return for day i, $CP_i$ is the closing price for day i, $CP_{i-1}$ is the closing price for the previous trading day.

The initial historical calculations are done for each day for the past 30 years of history. As an example, Table I lists the calculation results for Daily Price Returns and Daily Total Returns for SPDR S&P 500 ETF (ticker: SPY).

TABLE I

| Security | As of date | Close Price | Adjusted Close Price | Dividend | Daily Price Return | Daily Total Return |
|---|---|---|---|---|---|---|
| SPY | 2019 Apr. 5 | 288.57 | 288.57 | 0.00 | 0.48402 | 0.48402 |
| SPY | 2019 Apr. 4 | 287.18 | 287.18 | 0.00 | 0.26534 | 0.26534 |
| SPY | 2019 Apr. 3 | 286.42 | 286.42 | 0.00 | 0.15736 | 0.15736 |
| SPY | 2019 Apr. 2 | 285.97 | 285.97 | 0.00 | 0.04898 | 0.04898 |

In Step 1.2, for each day within the historical time period, the annualized total return for the 1-month time frame is calculated, that is, for the 1-month time period ending on a given day and if the data points for the entire 1-month sliding window is available. For example, if the price history starts from Jan. 1, 1989, the first day for having a 1-month annualized total return would be Feb. 1, 1989.

First at Step 1.2.1, calculate the 1-month cumulative return (CR) using geometric linking:

$$CR_{1M} = (1+DTR_1)*(1+DTR_2)* \ldots *(1+DTR_{21}) - 1 \qquad (9)$$

where $CR_{1M}$ is the cumulative 1-month return, $DTR_i$ is the daily total return of day i. There are on average 21 trading days in a month. For the sake of consistency, all 1-month analytics uses 21 trading days in the examples.

At Step 1.2.2, calculate the annualize 1-month return (AR), so that returns for other time frames such as 3-month and 6-month can be compared on the same scale.

$$AR_{1M} = (CR_{1M}+1)^{12} - 1 \qquad (10)$$

where $AR_{1M}$ is the annualized 1 M return, and there are 12 1-month time periods in one year.

At Step 1.3, calculate rolling 1-month Volatility.

$$\sigma_{annual} = SD(DTR_1, DTR_2, \ldots, DTR_{21})*sqrt(252) \qquad (11)$$

where $\sigma_{annual}$ is the annualized volatility, SD is the standard deviation of the daily total returns during the 1-month time horizon, and 252 is the number of trading days in a year.

In Step 1.4, Step 1.2 to Step 1.3 are repeated for other time horizons that includes, for example, 3-month, 6-month, 1-year, 3-year, 5-year, 10-year, 20-year and 30-year. Formulas for annualizing the returns are adjusted accordingly readily available in the literature. As an example, below are the formulas for annualizing 3-month return and 3-year return, respectively.

$$AR_{3M} = (CR_{3M}+1)^4 - 1 \qquad (12)$$

$$AR_{3Y} = (CR_{3Y}+1)^{(1/3)} - 1 \qquad (13)$$

At the end of this step, the rolling risks and returns for all time horizons for each day within the historical time period are obtained. For example, if it is Apr. 5, 2019 after market close, the calculated results will include: 1-month annualized return and volatility for the prior one month ending Apr. 5, 2019, which covers the time period of Apr. 5, 2019 going back 1 month (21 trading days); 3-month annualized return and volatility for the prior three months ending Apr. 5, 2019, which covers the time period of Apr. 5, 2019 going back 3 months; and annualized return and volatility results for time from Apr. 5, 2019 going back 6-Month, 1-Year, 3-Year, 5-Year, 10-Year, 20-Year and 30-Year; and the entire set of analytics for each day for the past 30 years. Having performed the entire set of analytics a complete risk and return profile is constructed. Table II lists some of the calculated results for SPDR S&P 500 ETF (ticker: SPY).

TABLE II

| Security | As of date | 1-Month Annualized Total Return | 1-Month Volatility | 3-Month Annualized Total Return | 3-Month Volatility | 6-Month Annualized Total Return | 6-Month Volatility | 1-Year Annualized Total Return | 1-Year Volatility | 3-, 5-, 10-, 20- and 30-Year analytics |
|---|---|---|---|---|---|---|---|---|---|---|
| SPY | 2019 Apr. 5 | 97.8886 | 11.1985 | 76.9750 | 10.5631 | 1.9756 | 19.4871 | 12.9206 | 15.2402 | And so on . . . |
| SPY | 2019 Apr. 4 | 68.8404 | 11.7744 | 98.0427 | 12.2690 | 1.1065 | 19.4754 | 13.2637 | 15.2521 | |
| SPY | 2019 Apr. 3 | 52.0564 | 12.0865 | 77.9094 | 13.3679 | 0.4549 | 19.4720 | 14.1726 | 15.2848 | |
| SPY | 2019 Apr. 2 | 45.7970 | 12.1264 | 77.5308 | 13.3694 | 0.8365 | 19.4770 | 15.4543 | 15.3341 | |

In Step 2 historical rolling risks and returns for all relevant securities are calculated. This means Step 1 is repeated for all relevant securities including other individual stocks, bonds, mutual funds and ETFs.

In Step 3 rolling risks and returns for models are calculated. For models, usually the weight ratios for each market segments are known. For example, a model may consist of 50% of U.S. stocks and 50% of bonds, so the weights are already set. To conduct the calculation, each market segment is also assigned a market reprehensive preferably using an index or ETF to represent. For example, for the U.S. stock market, one could use SPDR S&P 500 ETF (ticker: SPY) as representative because S&P 500 is best known, or Vanguard Total Stock Market ETF (ticker: VTI) to represent a broader U.S. stock market.

First, analytics engine 209 calculates the Daily Total Return (DTR) of the model, which is a weighted average of the DTR of each component, using the formula (14).

$$DTR = \Sigma(w_i \cdot DTR_i) \quad (14)$$

where DTR is the daily total return of the model, $w_i$ is the weight of component i, and $DTR_i$ is the daily total return of component i.

Daily Price Return of the model can be calculated similarly. Example calculated daily returns for a model are shown in Table III.

TABLE III

| Model | As of date | Daily Price Return | Daily Total Return |
|---|---|---|---|
| Classic Balanced 50/50 | 2019 Apr. 5 | 0.232390 | 0.232390 |
| Classic Balanced 50/50 | 2019 Apr. 4 | 0.129910 | 0.129910 |
| Classic Balanced 50/50 | 2019 Apr. 3 | 0.124446 | 0.124446 |
| Classic Balanced 50/50 | 2019 Apr. 2 | 0.023167 | 0.023167 |

The daily total returns, annualized returns and risks for each model for individual time horizons can be calculated using the same formulas in step 1.2, 1.3 and 1.4.

Example calculated results of the classic balanced (50/50) model are listed in Table IV.

After Step 3 the analytics engine continues to calculate a set of investment health indicators for each model portfolio for each time frame on a rolling basis based on real-time risk and return analytics comparing to long-term averages. The health indicators may at least include return health indicators, risk health indicators and efficiency health indicators.

A return health indicator for indicating whether the current return of a model portfolio is above or below a long-term average return is calculated using Equation 15. Based on how many standard deviations away the current return of a given time-frame is from a long-term (for example 30 years) average return, a return health indicator may be mapped as shown in Table V as an example. Ordinary person in the art can adjust or adopt a different mapping scale per preference or needs.

TABLE V

| Code | Number_of_std_dev_range_lower | Number_of_std_dev_range_upper |
|---|---|---|
| EXCELLENT | 0.25 | NULL |
| VERY_GOOD | 0.10 | 0.25 |
| GOOD | −0.10 | 0.10 |
| FAIR | −0.25 | −0.10 |
| POOR | −0.50 | −0.25 |
| VERY_POOR | NULL | −0.50 |

The number of how many standard deviations over a long-term average return for a particular model portfolio is calculated by Equation 15.

$$Number = (TR - AR)/\sigma \quad (15)$$

Where TR is the annualized total return of a given time frame, and AR is a long-term average return, $\sigma$ is the standard deviation of AR in this long-term time frame.

A risk health indicator for indicating whether the current volatility level of a model portfolio is above or below the long-term average volatility is calculated by Equation 16. The percentage difference between the volatility of a given time frame compared to a long-term average volatility, preferably for 30 years, for a model portfolio may be mapped as shown in Table VI to indicate whether the risk level is still healthy. Ordinary person in the art can adjust or adopt a different mapping scale per preference or needs.

TABLE VI

| Code | Percent_diff_range_lower | Percent_diff_range_upper |
|---|---|---|
| NORMAL | −20 | 25 |
| HIGH | 25 | 50 |
| VERY_HIGH | 50 | NULL |
| LOW | −40 | −20 |
| VERY_LOW | −100 | −40 |

TABLE IV

| Model | As of date | 1-Month Annualized Total Return | 1-Month Volatility | 3-Month Annualized Total Return | 3-Month Volatility | 6-Month Annualized Total Return | 6-Month Volatility | 1-Year Annualized Total Return | 1-Year Volatility | 3-, 5-, 10-, 20- and 30-Year analytics |
|---|---|---|---|---|---|---|---|---|---|---|
| Classic Balanced 50/50 | 2019 Apr. 5 | 45.6021 | 4.6091 | 36.2562 | 4.8756 | 6.1331 | 8.7379 | 6.8355 | 6.9531 | And so on . . . |
| Classic Balanced 50/50 | 2019 Apr. 4 | 35.0777 | 4.9533 | 43.5494 | 5.6493 | 5.1877 | 8.7387 | 6.8957 | 6.9551 | |
| Classic Balanced 50/50 | 2019 Apr. 3 | 25.3410 | 5.0951 | 38.0313 | 5.9832 | 4.7709 | 8.7380 | 7.2324 | 6.9672 | |
| Classic Balanced 50/50 | 2019 Apr. 2 | 28.0165 | 5.0980 | 37.7449 | 5.9840 | 4.9537 | 8.7374 | 7.6416 | 6.9833 | |

The percentage of volatility difference for a particular model portfolio is calculated by Equation 16:

$$\% \text{ Difference} = (V - AV)/AV \quad (16)$$

Where V is the volatility of a given time frame and AV is a long-term average volatility.

Portfolio efficiency measures whether the risk and return of a given model portfolio follow the high-risk high-return relationship. The Sharpe Ratio proposed by Nobel Laureate William Sharpe is a commonly used indicator defined by Equation 17.

$$\text{Sharpe Ratio} = \frac{R_p - R_f}{\sigma_p} \quad (17)$$

where:
$R_p$=return of portfolio
$R_f$=risk-free rate
$\sigma_p$=standard deviation of the portfolio The efficiency health indicator further qualifies portfolio efficiency using the mapping in Table VII.

TABLE VII

| Code | Sharpe_ratio_range_lower | Sharpe_ratio_range_upper |
| --- | --- | --- |
| VERY_LOW | NULL | 0.20 |
| LOW | 0.20 | 0.40 |
| NORMAL | 0.40 | 0.75 |
| HIGH | 0.75 | 1.00 |
| VERY_HIGH | 1.00 | NULL |

Step 4 is to calculate rolling risks and returns for investors' portfolios. Calculating analytics for investor's portfolios follows the same process as that for models. The only difference is that an investment portfolio is typically comprised of multiple positions which may change daily, the weights of them will have to be calculated for each day. In finance, a position is a security that the investor holds in number of shares (or equivalently, dollar amount). For example, a portfolio may have two positions: 500 shares of IBM and 3,000 shares of AAPL. The market value (MV) of a position is calculated using Equation 18:

$$MV = S * CP \quad (18)$$

Where MV is the market value of the position, S is the number of shares and CP is the closing price.

Then the total market value of a portfolio is calculated by adding up the market value of all the positions for this portfolio. The weight for each position is calculated using the position's market value divided by the overall market value.

$$TMV = \Sigma(MV) \quad (19)$$

where TMV is the total market value of the portfolio and $MV_i$ is the market value of position i.

$$w_i = MV_i / TMV \quad (20)$$

where $w_i$ is the weight of position i, $MV_i$ is the market value of position i and TMV is the total market value of the portfolio.

As an example, if IBM is at $80 per share and there are 500 shares, the market value of this position is $40,000. If AAPL is at $120 per share and there are 3000 shares, the market value of this position is $360,000. A portfolio made of these two positions has a total market value of $400,000, hence the weight for IBM is 10%, and the weight for AAPL is 90%.

Step 5 repeats the calculations in steps 1 to 4 to calculate the same set of analytics on a daily basis going forward.

Figure 6:
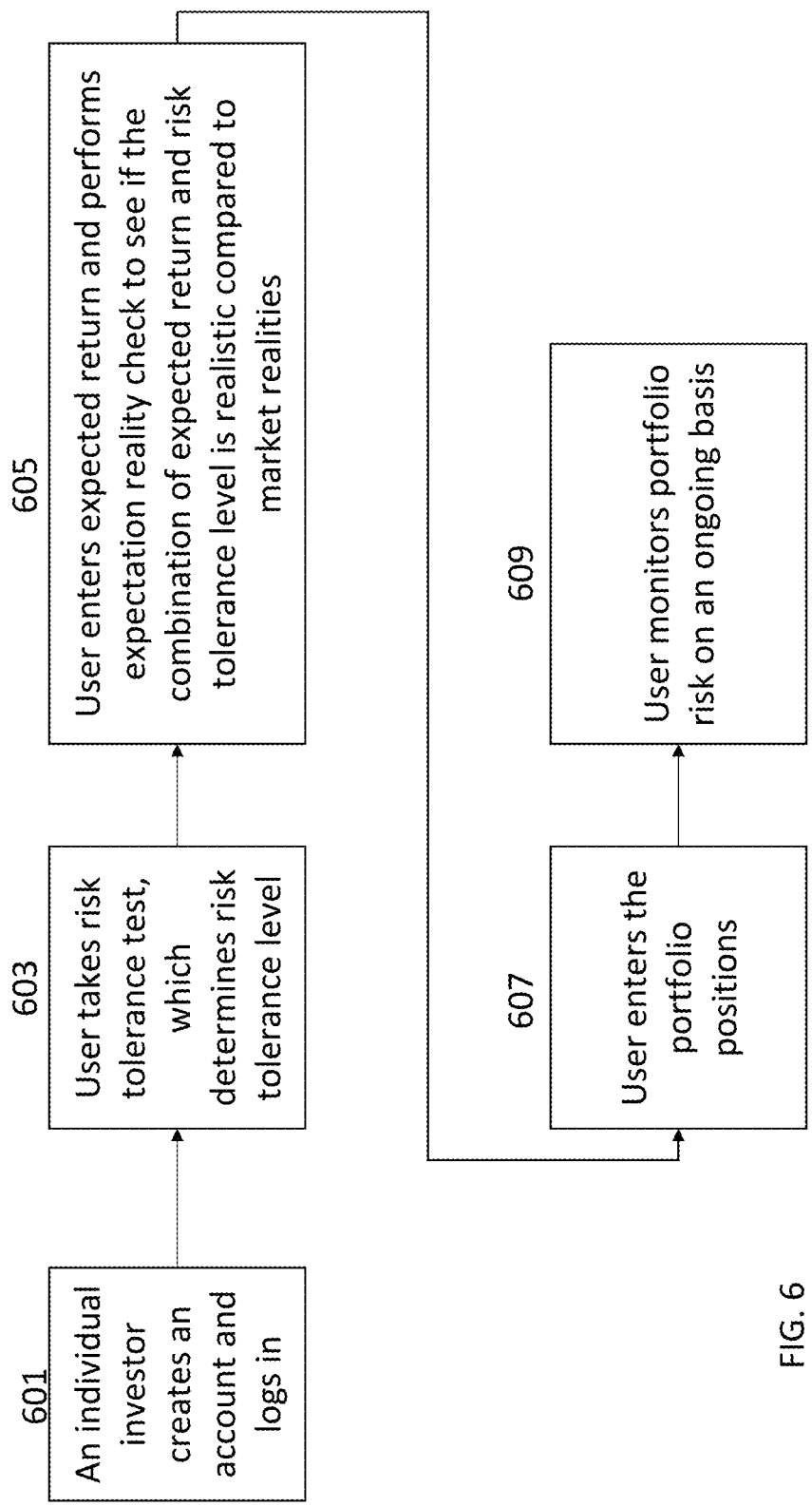
FIG. 6 is a flow chart for a user to establish his/her risk tolerance, manage investment expectations and monitor real-time portfolio risks in an example financial risk managing system in accordance with this application.

In reference to FIG. 6, a flow chart of functions and user interfaces of system 200 in FIG. 2 for individual investors is shown. At user interface 601, an individual investor creates an account in the system, and he/she can then log into the system. At user interface 603, the user can take a risk tolerance test and determines a risk tolerance level. At user interface 605, the user enters an expected return and performs an expectation reality check to see if the combination of expected return and risk tolerance level is within the normal range compared to market realities. At user interface 607, the user enters his/her portfolio positions, the system displays analytics results in terms of risks and returns for the portfolio on a graph at user interface 609, where the user can monitor the changes of the risk and return for this portfolio in real-time across the entire spectrum of short-term, medium-term and long-term horizons as illustrated in FIG. 2. The investor compares between the real-time (short term) and long-term average risks and returns of the model portfolios to determine whether to adjust his/her investment positions.

Figure 7:
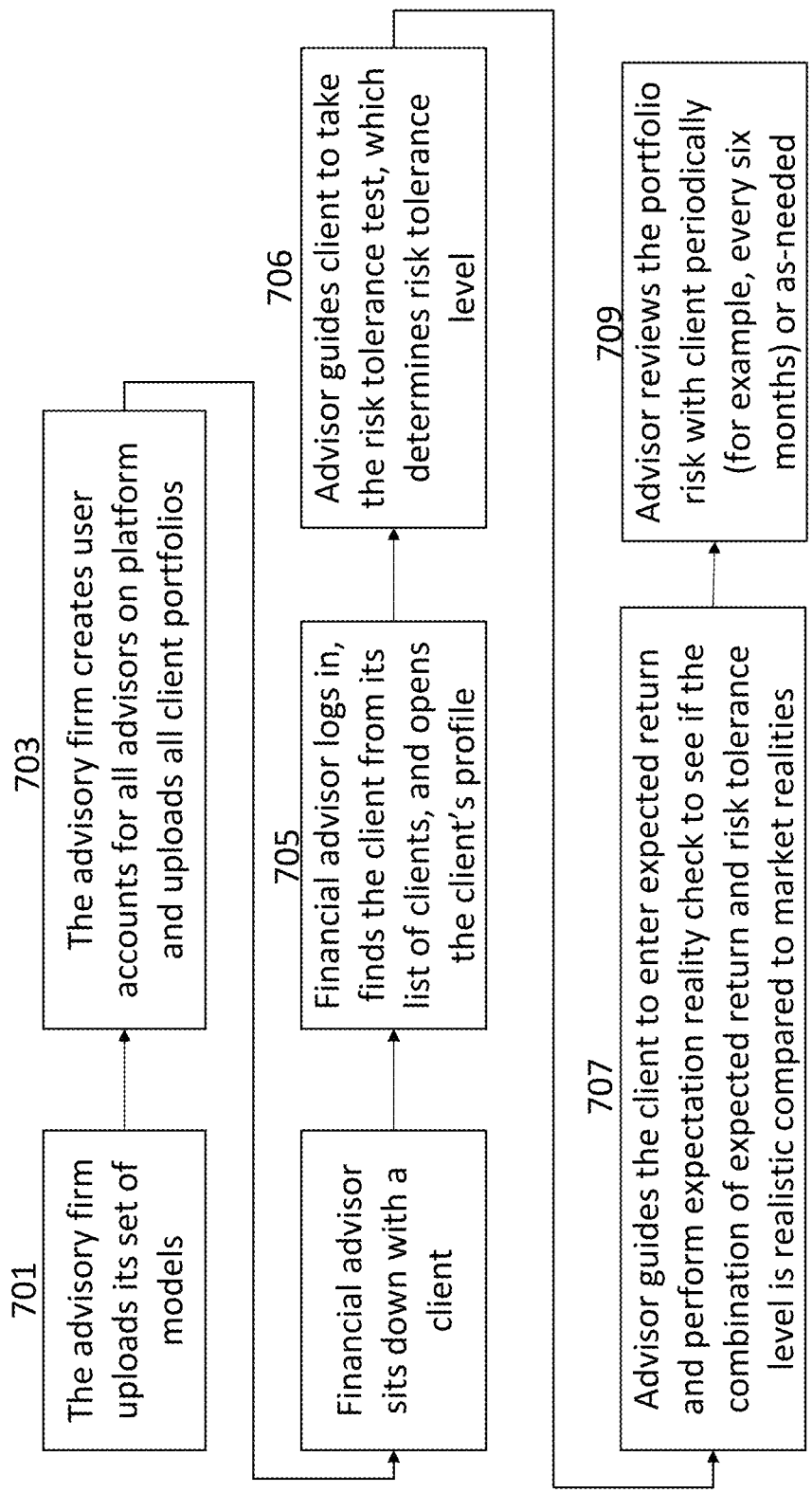
FIG. 7 is a flow chart for an advisory firm to work with their clients to establish risk tolerance, manage investment expectations and monitor real-time portfolio risks in an example financial risk managing system in accordance with this application.

In reference to FIG. 7, a flow chart of functions and user interfaces of system 200 in FIG. 2 for financial advisors is shown. At function 701, the system uploads a set of models of an advisory firm. At user interface 703, the advisory firm creates user accounts for all advisors on the platform and uploads all client portfolios. When a financial advisor sits down with a client, at user interface 705, the financial advisor logs in, finds the client from its list of clients, and opens the client's investment profile. At user interface 706, the financial advisor guides client to take a risk tolerance test which determines the client's risk tolerance level. At user interface 707, the financial advisor guides the client to enter an expected return and to perform an expectation reality check to determine if the combination of the client's expected return and risk tolerance level is realistic compared to market realities. At user interface 709, the financial advisor reviews the portfolio risk with the client, and periodically going forward, for example, every six months.

Figure 8:
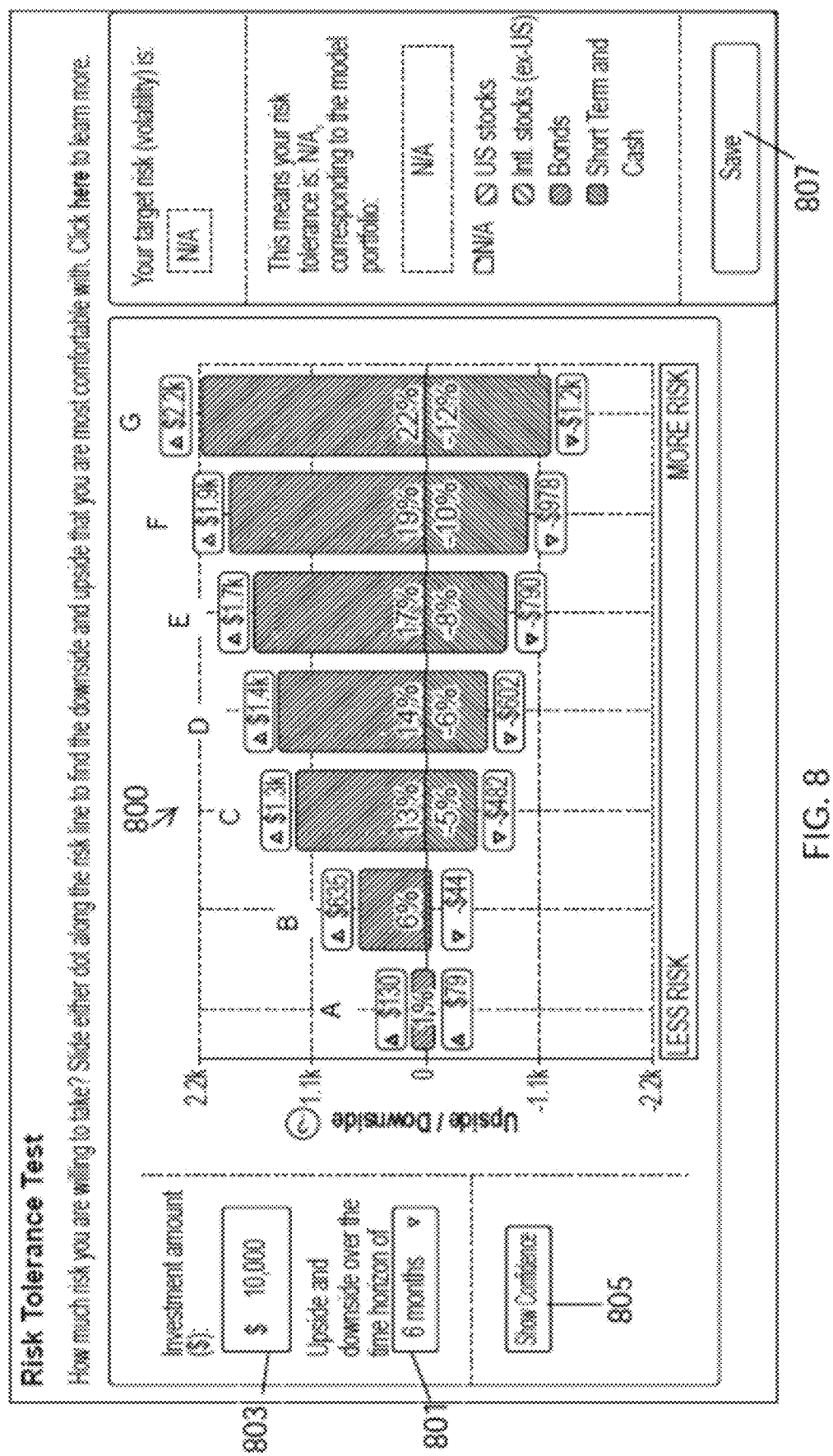
FIGS. 8 and 9 are example analytic graphs displayed on a screen for risk tolerance test of a user in an example financial risk managing system in accordance with this application.
Figure 9:
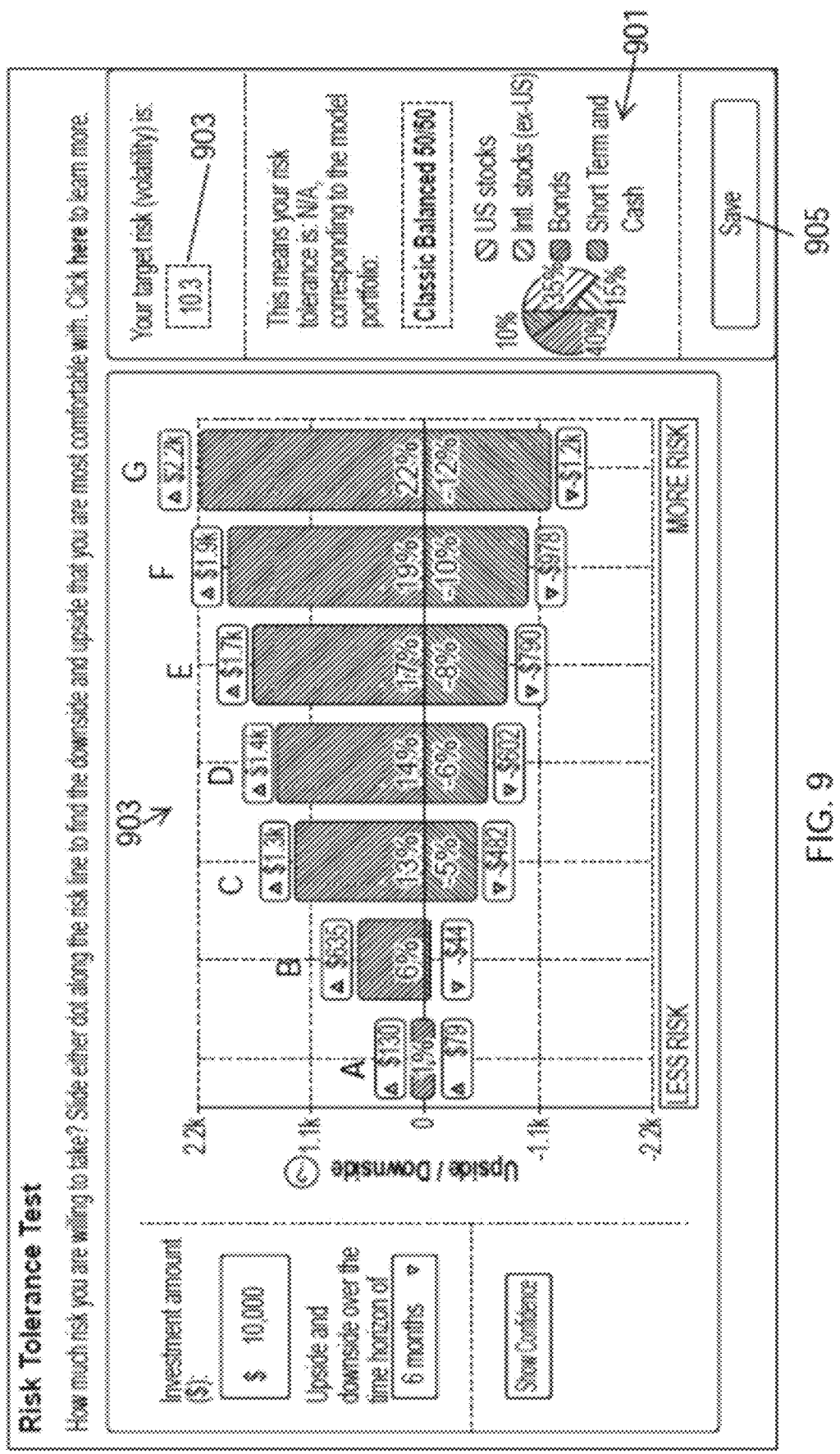

In reference to FIGS. 8 and 9, a Risk Tolerance Test screen 800 and 900 is shown to allow a user to select his/her risk tolerance level based on the upside and downside of an investment outcome displayed in the graph. In the example, the system first displays a pre-loaded default set of seven investment models A-G ranging from lower risk to higher risk in the chart. Alternatively, the advisory firm can load its own set of models at function 701, and the firm's own set of models will be displayed. On the left side of the screen, the user can select a time frame at 801 for the calculations of the upsides and downsides, and enter an initial amount of investment at 803.

In order to graphically demonstrate to the user what their actual choices look like, confidence box 805 is given that defines the range of upside and downside. There is no industry standard definition, one common approach is to use the 95% confidence possibility of a normal statistic distribution (the bell shape) to define the investment outcome's upper and lower bounds. And the returns are assumed to follow classic statistic possibility theories.

If µ denotes the mean (i.e. the average return) of a normal distribution and σ denotes the standard deviation (i.e. the volatility), the upper bound of 95% confidence interval is µ+2σ, and the lower bound is µ−2σ. However, using the upper and lower bounds of 95% confidence only makes sense if the user is mostly concerned with the maximum amount of loss he or she can tolerate. But 95% confidence interval used to indicate the upside and downside is likely to exaggerate the magnitude of possible gain and loss since the expected value of gain or loss is the statistical average. An investor with no advanced knowledge of finance and statistics could be misled. To solve this, one solution is to allow the use of other confidence intervals such as 80% confidence interval, which provides an upside and downside boundary between µ−1.28σ, µ+1.28σ. In addition, the present invention utilizes the expected value for the upside and downside of a half-normal distribution. The expected value of the left half of the normal distribution is µ−0.8σ, the expected value of the right half is µ+0.8σ. As a result, the present invention gives the users the options to choose from the expected value, 80% confidence interval as well as 95% confidence interval.

Based on the long-term average risks (10-30 years) of the various model portfolios, and the returns of the various model portfolios, the investment amount (803), time horizon (801) and the level of confidence (805), the system will then calculate the upside and downside of each model portfolio. The upside and downside are displayed as vertical bars in proportion. In FIGS. 8 and 9, the bar values A to G represent the possible gains and losses for initial $10,000 (803) in 6 months (801) with a confidence of 80% (default) under the guidance of the seven default model portfolios A-G.

Upon viewing these gain and loss bars, the user can decide which investment model he/she is most comfortable with to use as guide to build his/her investment portfolio. The user can directly click on the bar to choose a model portfolio. The long-term average risk associated with the chose model is then shown in 903 as shown in FIG. 9, and the corresponding investment model is shown at 901. The user can click save button 905 to save the selection in his or her profile as his or her risk tolerance level and profile.

As an example, the upside and downside bar for model C (Classic Balanced 50/50) is calculated as follows. Model C has an annualized return $\mu_{1Y}$=8.0%, and annualized volatility $\sigma_{1Y}$=10.3%. For the investment amount of $10,000, the 6-month time horizon and 80% confidence interval, the return and volatility for the 6-month time horizon by doing the reverse of the annualization process which are standard calculations in finance.

$$\mu_{6M}=\text{sqrt}(1+\mu_{1Y})-1=\text{sqrt}(1.08)-1=3.9\% \quad (21)$$

$$\sigma_M=\sigma_{1Y}/\text{sqrt}(2)=10.3\%/1.414=7.28\% \quad (22)$$

$$\text{Upside}=\mu_{6M}+1.28\cdot\sigma_{6M}=3.9\%+1.28*7.28\%=13.2\% \quad (23)$$

$$\text{Downside}=\mu_{6M}-1.28\cdot\sigma_{6M}=3.9\%-1.28*7.28\%=-5.4\% \quad (24)$$

When an investor builds his/her investment portfolio according to his/her risk tolerance level, the system will then monitors the real-time risks and returns for all model portfolios in the set as well as the investor's portfolio, and display them in the same graph so that the advisor and the investor can view the market dynamics and portfolio performance in real time and in the same graph. Whether the investment portfolio continues to align with the investor's risk tolerance level on an ongoing basis is thus displayed in the graph.

Figure 10:
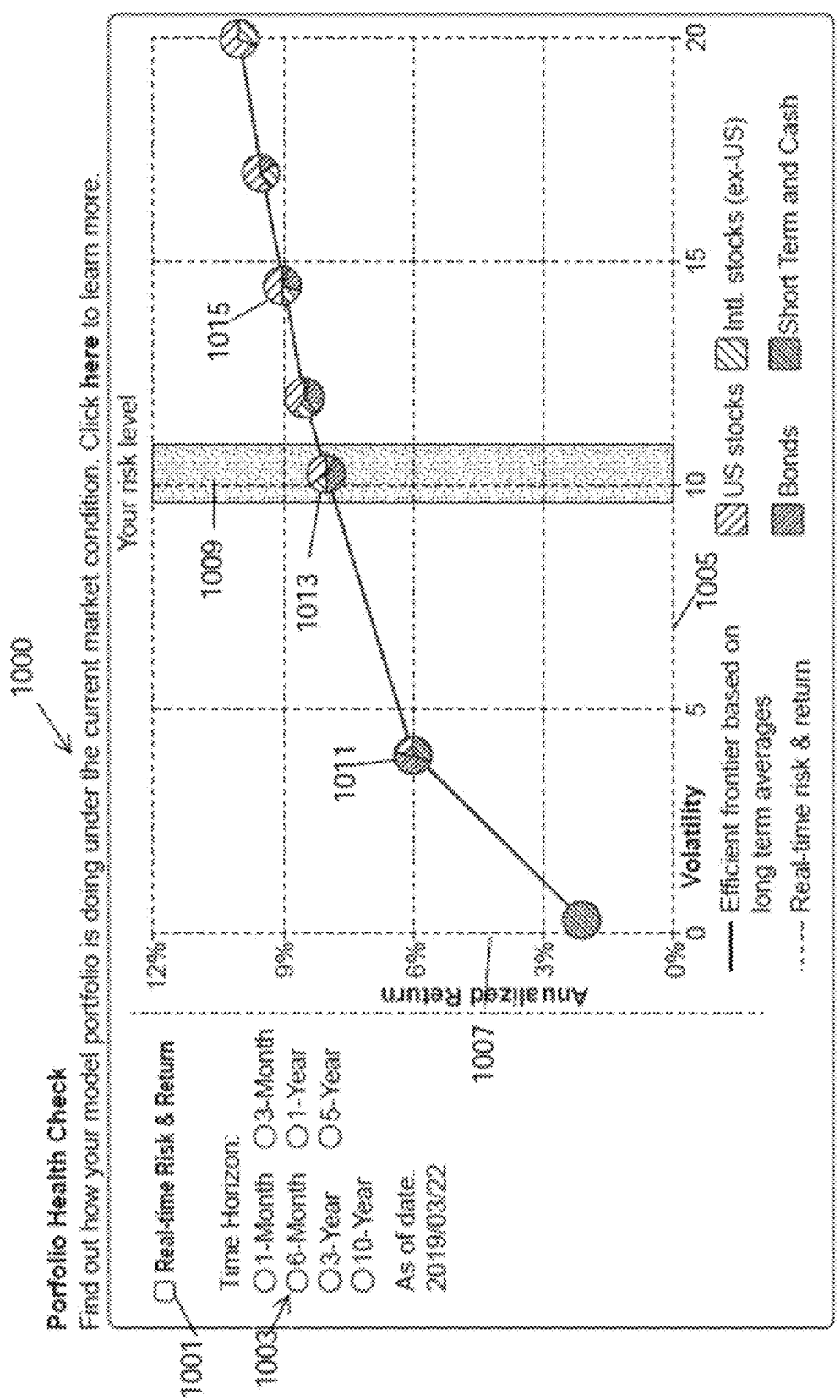
FIGS. 10 and 11 show example real-time risk and return analytic graphs displayed on a screen for portfolio health check in accordance with this application.

In reference FIG. 10, an example Portfolio Health Check graph 1000 is shown. The user interface has two layers. The first layer shows the long-term average risk and return for model portfolios on the risk and return chart, which reflects the classic efficient frontier. The second layer shows the actual risks and returns for various time horizons, which are calculated and updated daily, thus "real-time", to reflect the most recent market conditions. As such, check box 1001 is for selecting whether to display real-time risk and return in the graph, radio buttons 1003 are for selecting a time horizon for the analysis, 1005 is the axis for risk level and 1007 is the axis for annualized return, 1009 is a bar that indicates the investor's chosen risk tolerance level.

When the "real-time risk and return" checkbox 1001 is unchecked and the time horizon radio buttons 1003 are disabled, graph 1000 shows only the long-term averages (typically 30 years or shorter or longer). The mini pies in the graph represent different model portfolios. For example, mini pie chart 1013 represents the classic balanced model positioned in the chart with its long-term annualized return 8% and risk level of 10.3. Mini pie chart 1011 represents a conservative model, and mini pie chart 1015 a growth model. This chart 1000 shows the classic efficient frontier which serves as the starting point for analytics. The investor's target risk tolerance level is shown as a highlighted colored bar 1009 on the chart.

Figure 11:
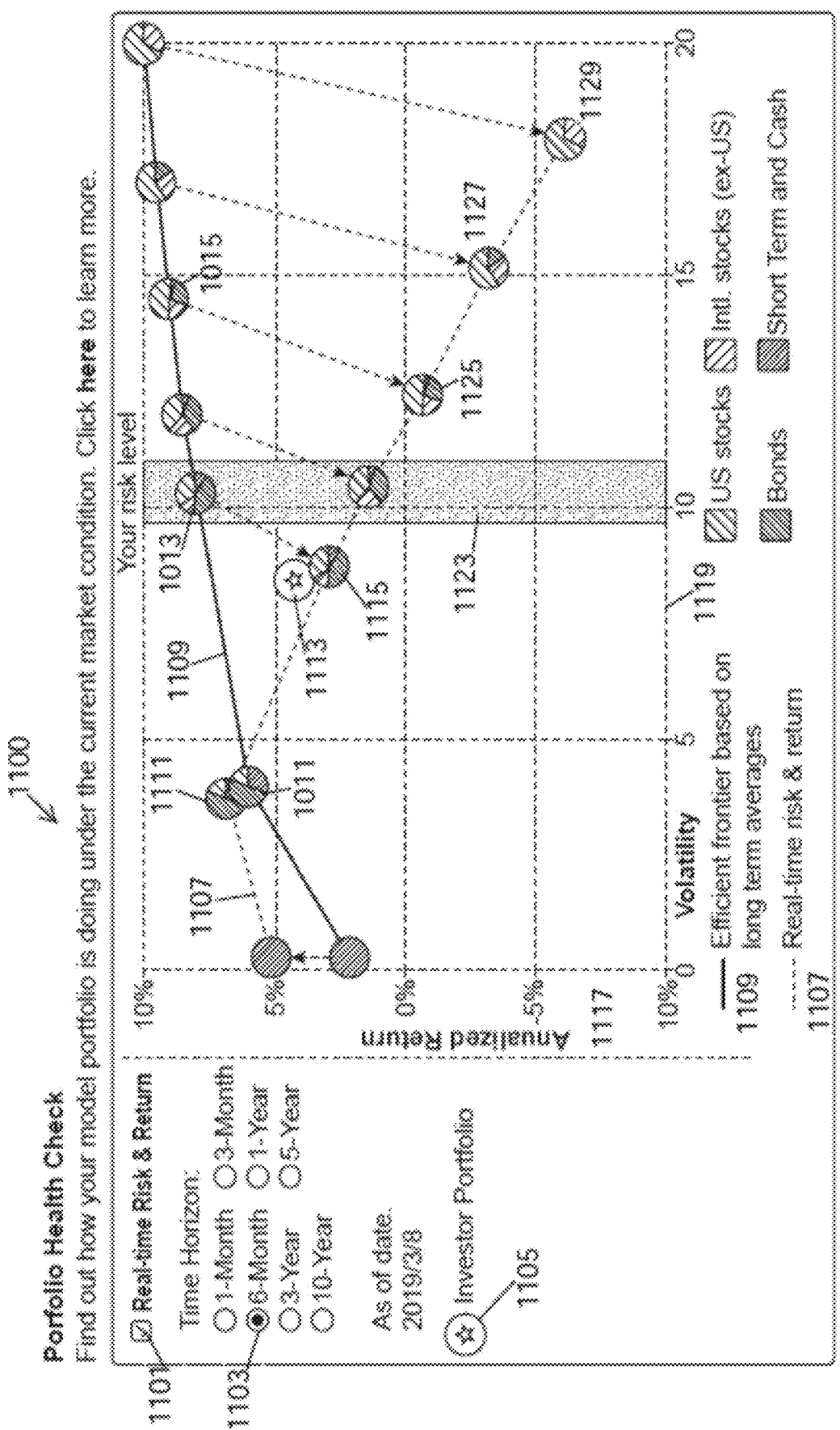

In reference to FIG. 11, another example Portfolio Health Check graph 1100 is shown. When the "real-time risk and return" checkbox 1101 is checked, graph 1100 displays a dotted line 1107 for real-time risk and return for the model portfolios as well as that for the user's investment portfolio (shown as a circled star 1105 in the legend, a circled star 1103 in the graph). The solid line 1109 represents the same 30-year long-term averages of FIG. 10, represented by mini pie charts 1011, 1013, 1015 etc. each representing a model. The dotted line 1107 shows that the real-time risks and returns of the same set of model portfolios, with mini pie charts 1111, 1115, 1125 etc. each representing the real-time annualized return and risk for the respective model for the chosen time horizon 1103. The real-time risks and returns usually differ from their long-term averages. If the investor's investment portfolio is available, its real-time risk and return is charted in the same graph as a circled star 1113. 1119 is the axis for risk level and 1117 is the axis for annualized return, same as FIG. 10.

The position of 1113 of the investor's investment portfolio relative to the various models' positions in the chart and the user's risk tolerance level 1123 indicates whether the investor portfolio's actual risk exposure is in line with the investor's risk tolerance level; and whether the risk taken is rewarded by higher return. For example, as shown in graph 1100, as indicated by the models 1125, 1127 and 1129 which show an trend of higher risks lower returns, higher risks do not yield higher return; even though the investor's portfolio's real time risk of star circle 1113 is lower than its chosen risk tolerance 1123 (circle 1113 is at the left side of bar 1123), the investor may want to adjust his/her investment towards a more conservative position by shifting his or her investment portfolio towards closer to model 1111.

This Portfolio Health Check graph also helps to reduce investor panics and irrational responses due to short-term market movements. For example, if the market has significant declines for a few days in a row, it helps the investors to remain calm and avoid over-reaction if the 3-month and 6-month risk and return are within the risk tolerance normal range.

Charting real-time risks and returns can be applied in other use cases. For example, an advisor can look at portfolios of all of his/her clients at once in the same graph to quickly identify which portfolios are outliers thus requiring attention. The manager of an advisory firm can look at all portfolios across the firm to quickly identify underperforming financial advisors and spot any potential issues. Furthermore, with increasing popularity of fund market place and model market place, charting all funds and/or all models on the same graph can help financial advisors and their clients quickly identify better performing funds and models over different time horizons in real-time.

Figure 12:
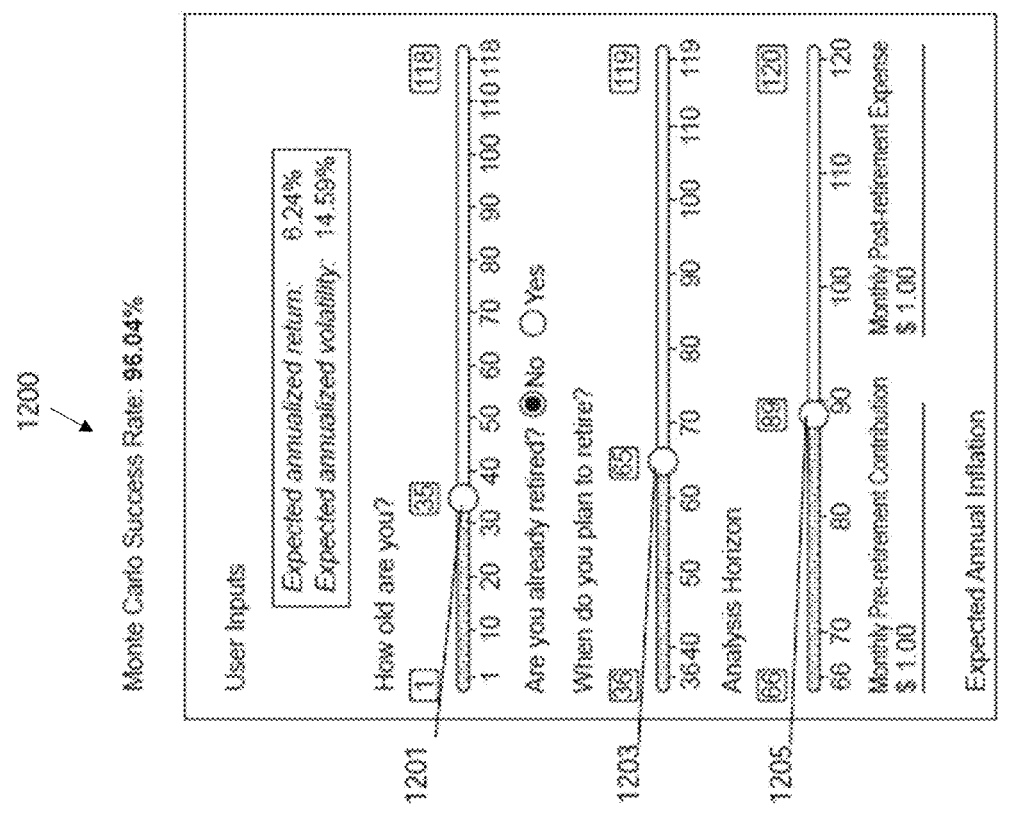
Figure 13:
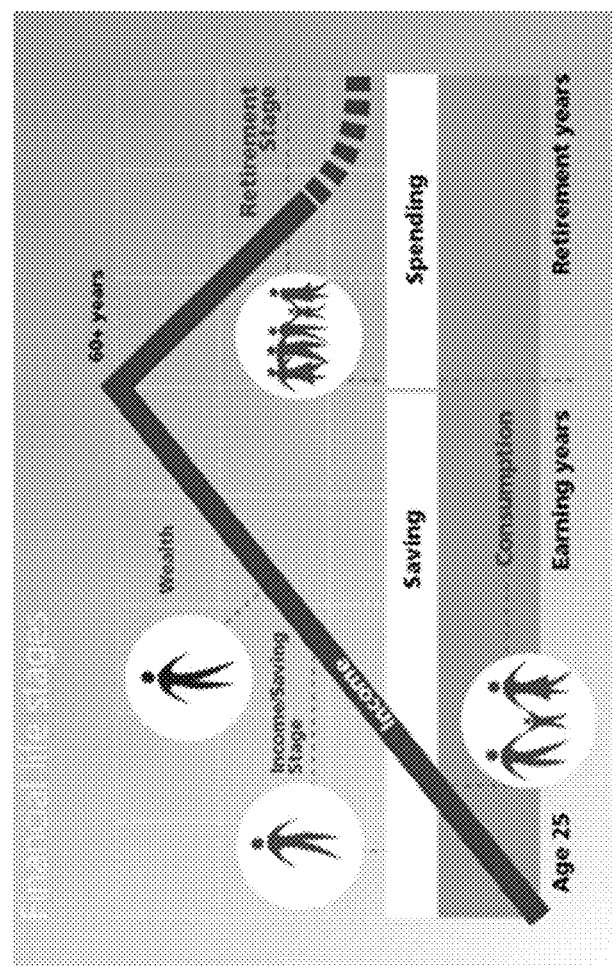
FIG. 13 demonstrates various financial stages of a person in the United States, commonly used to aid financial planning and risk management.
Figure 14:
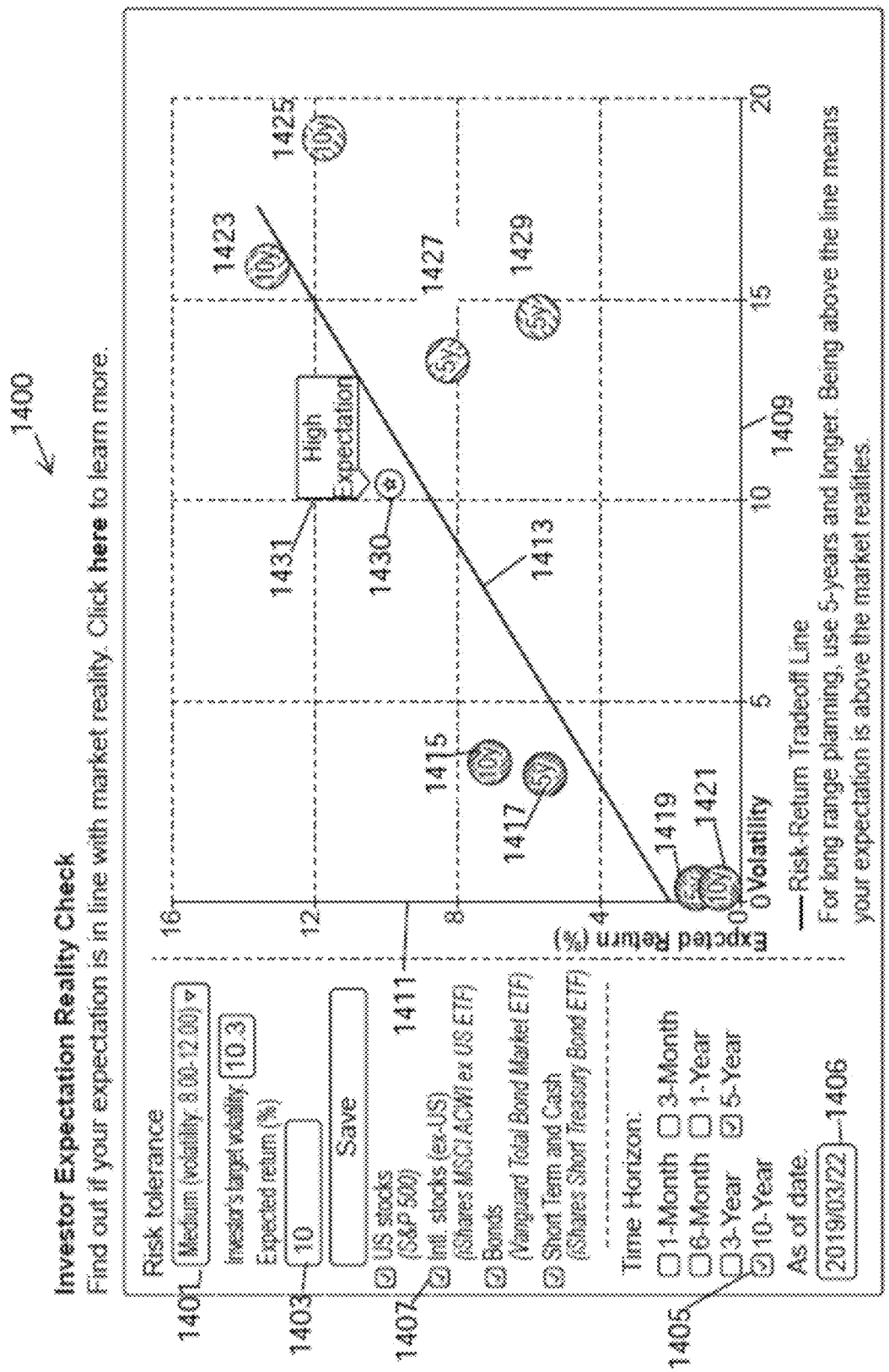
FIG. 14 is an example real-time analysis graph displayed on a screen of a user's investment expectation versus risk tolerance in accordance with this application.

FIG. 12 and FIG. 13 illustrates the financial planning process in preparation for FIG. 14. A financial planning process helps people decide how much they need to save now in order to meet their financial needs in the future such as for retirement. In reference to FIG. 12, a similar user interface 1200 for user input for financial planning is shown. A user may input his/her age by sliding bar 1201; his/her planned retirement age by sliding bar 1203; and an analysis horizon for life expectancy by sliding bar 1205.

FIG. 13 illustrates the accumulation of wealth prior to retirement and the subsequent withdrawal after retirement. Because the money saved is typically put into investments until withdrawal, a realistic expected return will give the investors an accurate sense of whether they are saving enough. If not, they can adjust their plan accordingly, either to save more, work longer and/or adjust the expected spending after retirement. The investor's return expectations against market realities can be validated using the risk and return charts to allow investors to effectively manage their financial expectations.

In reference to FIG. 14, Expectation Reality Check user interface 1400 has three layers: market reality as denoted by the risks and returns of key markets (1407) and/or model portfolios for various time horizons (1405) in the risk (axis 1409) return (axis 1411) chart. The best fit line connecting the data points from the various key markets shows the relationship between risk and return; and whether the investor's risk level and his or her expected return are in-line with the market can thus be determined on the best fit line.

Each key market is represented by an ETF or index. For example, the U.S. stock market is represented by S&P 500, international stock market by iShares MSCI All Country World Index excluding U.S. (ACWI ex. US) ETF, bond market by Vanguard Total Bond Market ETF, and short term and cash market by iShares Short Treasury Bond ETF. User may select multiple markets through check boxes 1407. Multiple market segments are used for establishing a relevant realistic risk and return relationship. Multiple time horizons may be selected in check boxes 1405 for analysis.

The risks and returns for selected key markets for selected time horizons are calculated on a daily basis, hence graph 1400 is shown in real-time. Each dot in the chart represents the risk and annualized return for a particular market segment for a particular time horizon ending at the "as of date" 1406. For example, if the as-of-date is 2019 Mar. 22, the brown dot for "5Y" indicates the risk and return for the US stock market (as represented by S&P 500) for the 5-year time horizon ending 2019 Mar. 22. In graph 1400, both the 5-year and 10-year risks and annualized returns are dotted as 1419, 1421, 1417, 1415, 1429, 1427, 1423 and 1425 for the selected key markets of check boxes 1407, best fit line 1413 is drawn between these dots to show a correlation between risks and returns.

The best fit line 1413 is drawn between the dots, which can be a linear or non-linear line, shows the realistic relationship between risk and return based on up-to-date market conditions. The simplest approach is to do the standard best fit line for the scatter plot. There are many online literatures searchable with keywords risk and return and best fit, for example, https://www.investopedia.com/terms/l/line-of-best-fit.asp. This is the favorable approach as an example for FIG. 14. There are several other approaches. A slightly more sophisticated approach is to divide the dots into three groups, i.e. cash equivalents, bonds and stocks, and find the average for each group, and then connect the averages for each group. An even more sophisticated approach would be to construct an efficient frontier based on the average risks and returns for the three groups using the standard mathematical methods.

The investor's expectation can also be defined using the Sharpe Ratio with the mapping table VIII below (note the parameters for each bucket can be adjusted as needed). This can be used in conjunction with the visual graph to reinforce the result.

TABLE VIII

| Code | Sharpe_ratio_range_lower | Sharpe_ratio_range_upper |
| --- | --- | --- |
| EXPECTATION_UNREALISTIC | 0.90 | 2.00 |
| EXPECTATION_AGGRESSIVE | 0.75 | 0.90 |
| EXPECTATION_REASONABLE | 0.40 | 0.75 |
| EXPECTATION_MODEST | 0.20 | 0.40 |
| EXPECTATION_LOW | 0.00 | 0.20 |

The investor's target risk tolerance level is inputted at 1401 and the expected return is inputted at the form 1403. Stared dot 1430 in the graph presents the position of investor's risk tolerance level and his/her expected return. If the investor has taken the risk tolerance test, the result of the risk tolerance test is carried over to this graph. If the investor has not taken the risk tolerance test, the default is set to medium, and the investor can select a different risk level, for example, Low, Medium Low, Medium, Medium High, High, Very High as set in Table VIII. Since each risk level is associated with a volatility range, the mid-value may be used in the graph.

Graph 1400 will immediately show whether the investor's risk tolerance and return expectations are in-line with market realities. As shown as an example, since stared dot 1430 is above the market return and risk correlation line 1413, it shown that the expected return at the chosen level risk tolerance is too high, which is indicated by a hover-over text box 1431. Similarly, if the investor's expected return is right on the line 1413, the expected return is realistic. If it is below the line 1413, it means the expectation is modest compared to market reality. The expected return is a key input for financial planning and this graph helps investor determine a realistic expected return for their risk level.

This set of risk visualization and monitoring tools brings much-needed transparency and insights to investment management for individual investment portfolios; and provides a platform for financial advisors and clients to have deeper, more meaningful conversations in building a trusting relationship. Specifically, the risk tolerance test sets up a realistic scenario using model portfolios based on market data to receive a more accurate response from a user. Real-time risk visualization reduces irrational impulses that can lead to over-trading while protecting investors from excessive, unproductive risk exposures during downturns. The system also helps managing return expectations, hence enables more accurate financial planning.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed is:

1. A method for computerized real-time investment risk management, comprising the steps of:
    providing a computer system for displaying graphics and running computer operating systems;
    providing a computer module for retrieving historical financial market data of a historical time period wherein said historical financial market data include data of a set of securities and daily financial market data for said set of securities;
    providing a computer module for entering, storing and retrieving a set of model portfolios, and at least one investment portfolio;
    providing a computer analytics engine,
    wherein said computer analytics engine calculates a set of Adjusted Closing Price (ACP), Daily Total Returns (DTR) based on said set of ACPs for said set of securities for each day within said historical time period using said historical financial market data; and a set of annualized risks and returns based on said DTRs for a set of particular time windows on a rolling basis within said historical time period and going forward on a daily basis for the set of securities or said at least of one investment portfolio comprised of a combination of securities; and
    providing a computer graphic engine wherein return and risk are used as axes for analytic graphs to visually display the of annualized risks and returns, said analytic graphs showing visual relationships between the set of annualized risks with returns.

2. The method of claim 1, wherein said set of particular time windows includes at least a one-month time window, a 3-month time window, and a 6-month time window.

3. The method of claim 2, wherein said set of particular time windows further includes at least a one-year time window, a 5-year time window, a 10-year time window, a 20-year time window and a 30-year time window, and the historical time period is 30 years.

4. The method of claim 1, wherein said computer analytics engine further calculates a corresponding set of investment health indicators including return health, risk health and efficiency health for a security or an investment portfolio based on a long-term average return and a current return of a given time-frame and corresponding standard deviations between said long-term average return and said current return of the given time-frame, and
    a corresponding volatility percentage difference between a volatility of a given time frame compared to a long-term average volatility, for the security or the investment portfolio.

5. The method of claim 1, said method further comprising a step of calculating a set of upsides and downsides in terms of value for a set of model portfolios based on 10-year to 30-year long-term average risks and returns or projections of future risk and return of said set of model portfolios and a choice of confidence intervals ranging from 95% to 50%; and
    a step of displaying said set of upsides and downsides in terms of value in one same graph.

6. The method of claim 5, said method further comprising a step of providing a user interface for accepting a choice of a model portfolio from an investor by clicking on a upside and downside pair, and saving a long-term average risk or a projected risk of the chosen model portfolio as the investor's risk tolerance level.

7. The method of claim 1, wherein said computer analytics engine further calculates a second set of Daily Total Returns (DTR) for a set of key markets for each day within a set of particular time periods, and a second set of risks and annualized returns based on said second DTRs for said set of particular time periods on a rolling basis and going forward on a daily basis;
    said method of claim 1 further comprising a set of
        providing a user interface for accepting a user's choice of risk tolerance level and a user's expected return value; and
    said computer graphic engine displays said user's risk tolerance and expected return value together with a linear or non-linear best fit line for the second set of annualized returns over corresponding said second set of risks in one same graph.

8. The method of claim 7, wherein said choice of risk tolerance level and user's expected return is mapped to a Sharpe Ratio to indicate whether such a combination is realistic according to market realities.

9. A computerized real-time investment risk management system, comprising:
    a computer system for displaying graphics and running computer operating systems;
    a computer module for retrieving historical financial market data of a historical time period wherein said historical financial market data include data of a set of securities and daily financial market data for said set of securities;
    a computer module for entering, storing and retrieving a set of model portfolios, and at least one investment portfolio;
    a computer analytics engine,
        wherein said computer analytics engine calculates a first set of Adjusted Closing Price (ACP), Daily Total Returns (DTR) based on said set of ACPs for said set of securities for each day within said historical time period using said historical financial market data; and a set of annualized risks and returns based on DTRs for a set of particular time windows on a rolling basis within said historical time period and going forward on a daily basis for the set of securities or said at least of one investment portfolio comprised of a combination of securities; and
    a computer graphic engine wherein return and risk are used as axes for analytic graphs to visually display the first set of annualized risks and returns, and said analytic graphs showing visual relationships between the set of annualized risks and returns.

10. The system of claim 9, wherein said set of particular time windows includes at least a one-month time window, a 3-month time window, and a 6-month time window.

11. The system of claim 10, wherein said set of particular time windows further includes at least a one-year time window, a 5-year time window, a 10-year time window, a 20-year time window and a 30-year time window, and the historical time period is 30 years.

12. The system of claim 9, wherein said computer analytics engine further calculates a corresponding set of investment health indicators including return health, risk health and efficiency health for a security or an investment portfolio
based on a long-term average return and a current return of a given time-frame and corresponding standard deviations between said long-term average return and said current return of the given time-frame, and
a corresponding volatility percentage difference between a volatility of a given time frame compared to a long-term average volatility, for the security or the investment portfolio.

13. The system of claim 9, wherein said computer analytics engine further calculates a set of upsides and downsides in terms of value for a set of model portfolios based on 10-year to 30-year long-term average risks and returns or projections of future risk and return of said set of model portfolios and a choice of confidence intervals ranging from 95% to 50%; and
a step of displaying said set of upsides and downsides in terms of value one same graph.

14. The system of claim 13, said system further comprising a user interface for accepting a choice of a model portfolio from an investor by clicking on a upside and downside pair, and saving the long-term average risk or a projected risk of the chosen model portfolio as the investor's risk tolerance level.

15. The system of claim 9, wherein said computer analytics engine further calculates a second set of Daily Total Returns (DTR) for a set of key markets for each day within a set of particular time periods, and a second set of risks and annualized returns based on said second DTRs for said set of particular time periods on a rolling basis and going forward on a daily basis;
said system further comprising a user interface for accepting a user's choice of risk tolerance level and a user's expected return value; and
wherein said computer graphic engine displays said user's risk tolerance and expected return value together with a linear or non-linear best fit line for the second set of annualized returns over corresponding said second set of risks in one same graph.

16. The system of claim 15, wherein said choice of risk tolerance level and user's expected return is mapped to a Sharpe Ratio to indicate whether such a combination is realistic according to market realities.

* * * * *